United States Patent
Elazary et al.

(10) Patent No.: US 11,562,320 B2
(45) Date of Patent: Jan. 24, 2023

(54) DECOUPLED ORDER FULFILLMENT

(71) Applicant: inVia Robotics, Inc., Westlake Village, CA (US)

(72) Inventors: Lior Elazary, Agoura Hills, CA (US); Daniel Frank Parks, II, Los Angeles, CA (US); Randolph Charles Voorhies, Sherman Oaks, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 402 days.

(21) Appl. No.: 16/517,818

(22) Filed: Jul. 22, 2019

(65) Prior Publication Data

US 2021/0027236 A1 Jan. 28, 2021

(51) Int. Cl.
*G06Q 10/10* (2012.01)
*G06Q 10/08* (2012.01)
(Continued)

(52) U.S. Cl.
CPC .......... *G06Q 10/087* (2013.01); *B25J 9/1661* (2013.01); *B25J 9/1664* (2013.01);
(Continued)

(58) Field of Classification Search
CPC ..... G06Q 10/087; B25J 9/1661; B25J 9/1664; B25J 9/1687
(Continued)

(56) References Cited

U.S. PATENT DOCUMENTS 7,894,933 B2 * 2/2011 Mountz ................ G06Q 10/087
 700/214
2011/0130857 A1 * 6/2011 Budiman ............... G06Q 50/04
 700/104
(Continued)

OTHER PUBLICATIONS

Demantic , Are you Ready for Robotic: Each Picking? Nine Questions to Ask., Whitepaper https://www.dematic.com/en-us/downloads-and-resources/white-papers/ (Year: 2019).*
(Continued)

*Primary Examiner* — Charles Guiliano
*Assistant Examiner* — Thea Labogin
(74) *Attorney, Agent, or Firm* — Ansari Katiraei LLP; Arman Katiraei; Saqid Ansari

(57) ABSTRACT

Provided are systems and methods for maximizing saturation of two different sets of actors performing different sets of dependent operations at different rates over different but overlapping periods of time in a non-conflicting manner. The systems and methods may include transferring a first set of ordered items from item storage to item cache locations at a first rate during a first period of time, and fulfilling orders at a faster second rate over a later second period of time by picking items from a first set of the item cache locations at the second rate, and by replacing items at a non-overlapping second set of the item cache locations at the first rate. The transferring is commenced before the picking to create a buffer that allows a first set of actors, operating at the first rate, to continually provide the dependencies needed for a second set of actors to operate at the faster second rate (Continued)

without conflict and with each set of actors operating at their respective maximum rates.

16 Claims, 15 Drawing Sheets

(51) Int. Cl.
   *G06Q 50/28* (2012.01)
   *B65G 1/137* (2006.01)
   *B25J 9/16* (2006.01)
(52) U.S. Cl.
   CPC ............ *B25J 9/1687* (2013.01); *G06Q 50/28* (2013.01); *B65G 1/1378* (2013.01)
(58) Field of Classification Search
   USPC ........................................................ 705/7.13
   See application file for complete search history.

(56) References Cited

U.S. PATENT DOCUMENTS

| | | | | |
|---|---|---|---|---|
| 2013/0031876 A1* | 2/2013 | Fritzsche | ........... | B65G 47/5104 53/167 |
| 2018/0158016 A1* | 6/2018 | Pandya | ............ | G05B 19/41895 |
| 2020/0074402 A1* | 3/2020 | Adato | ................ | G06Q 10/0875 |
| 2020/0103921 A1* | 4/2020 | Voorhies | .............. | G05D 1/0217 |
| 2020/0211037 A1* | 7/2020 | Thirunavukkarasu | ....................... G06Q 30/0204 | |

OTHER PUBLICATIONS

Debjit Roy, Shobhit Nigam, Rene de Koster, Ivo Adan, Jacques Resing, Robot-storage zone assignment strategies in mobile fulfillment systems, Transportation Research Part E: Logistics and Transportation Review, vol. 122, (Year: 2019).*
Xiaowei Jiang, Yaxian Zhou, Yuankai Zhang, Lijun Sun, Xiangpei Hu, Order batching and sequencing problem under the pick-and-sort strategy in online supermarkets, Procedia Computer Science, vol. 126, (Year: 2018).*
Henn, Sebastian. "Algorithms for on-line order batching in an order picking warehouse." Computers & Operations Research 39.11 (2012): 2549-2563 (Year: 2012).*
Enright, John J., and Peter R. Wurman. "Optimization and coordinated autonomy in mobile fulfillment systems." Workshops at the twenty-fifth AAAI conference on artificial intelligence. 2011. (Year: 2011).*
Jiang, Xiaowei, et al. "Order batching and sequencing problem under the pick-and-sort strategy in online supermarkets." Procedia computer science 126 (2018): 1985-1993. (Year: 2018).*
Zhang, Jun, et al. "On-line order batching and sequencing problem with multiple pickers: A hybrid rule-based algorithm." Applied Mathematical Modelling 45 (2017): 271-284. (Year: 2017).*

* cited by examiner

DECOUPLED ORDER FULFILLMENT

BACKGROUND INFORMATION

Order fulfillment in a warehouse or other site may involve at least two different sets of operations that are performed by two different sets of actors. The first set of operations may include retrieving different items of an order from storage locations within the site to a packing station. The second set of operations may include aggregating and/or packing the retrieved items of the order into a common container at the packing station.

Traditional workflows have resulted in inefficient usage of the actors performing the retrieval, packing, and/or other operations associated with order fulfillment. For instance, a first actor may travel across a site in order to retrieve and aggregate different items for a first order, and a second actor may travel much of the same path in order to retrieve and aggregate some of the same or different items for a second order. Similarly, the first actor may move to opposite ends of the site in order to retrieve the items of the first order, even though second and third actors may already be located at the opposite ends of the site and may be performed retrieval operations for different orders.

To prevent some of the inefficiencies described above, the retrieval and packing operations may be divided between different sets of actors. However, having one set of actors exclusively perform one set of operations and another set of actors exclusively perform another set of operations can lead to other inefficiencies. For instance, a first set of actors may complete operations at a faster rate than a second set of actors and the operations may include dependencies such that the first set of actors are left waiting for the second set of actors to complete their operations before the first set of actors can perform additional operations. As a specific example, a first actor may aggregate and pack items faster than one or more actors retrieve and deliver the items. In this example, the first actor operates in bursts rather than in a continuous manner because the first actor is dependent on the one or more other actors completing their operations first. Conversely, a first actor may retrieve and deliver a tote carrying multiple units of a particular item to a second actor, but the first actor may have to wait for the second actor to finish picking different items from another tote before the second actor can begin picking items from the tote delivered by the first actor. The first actor may wait until the second actors completes its picks from the tote before returning the tote to its storage location. In this case, the first actor may spend indeterminate amounts of time waiting in a queue because of the different rates at which the first and second sets of actors operate.

In the examples above, the inefficiencies stem unbalanced execution of dependent operations by different actors. The loss in efficiency results increased costs, lowered overall productivity, and unnecessary resource utilization.

DETAILED DESCRIPTION OF PREFERRED EMBODIMENTS

Figure 1:
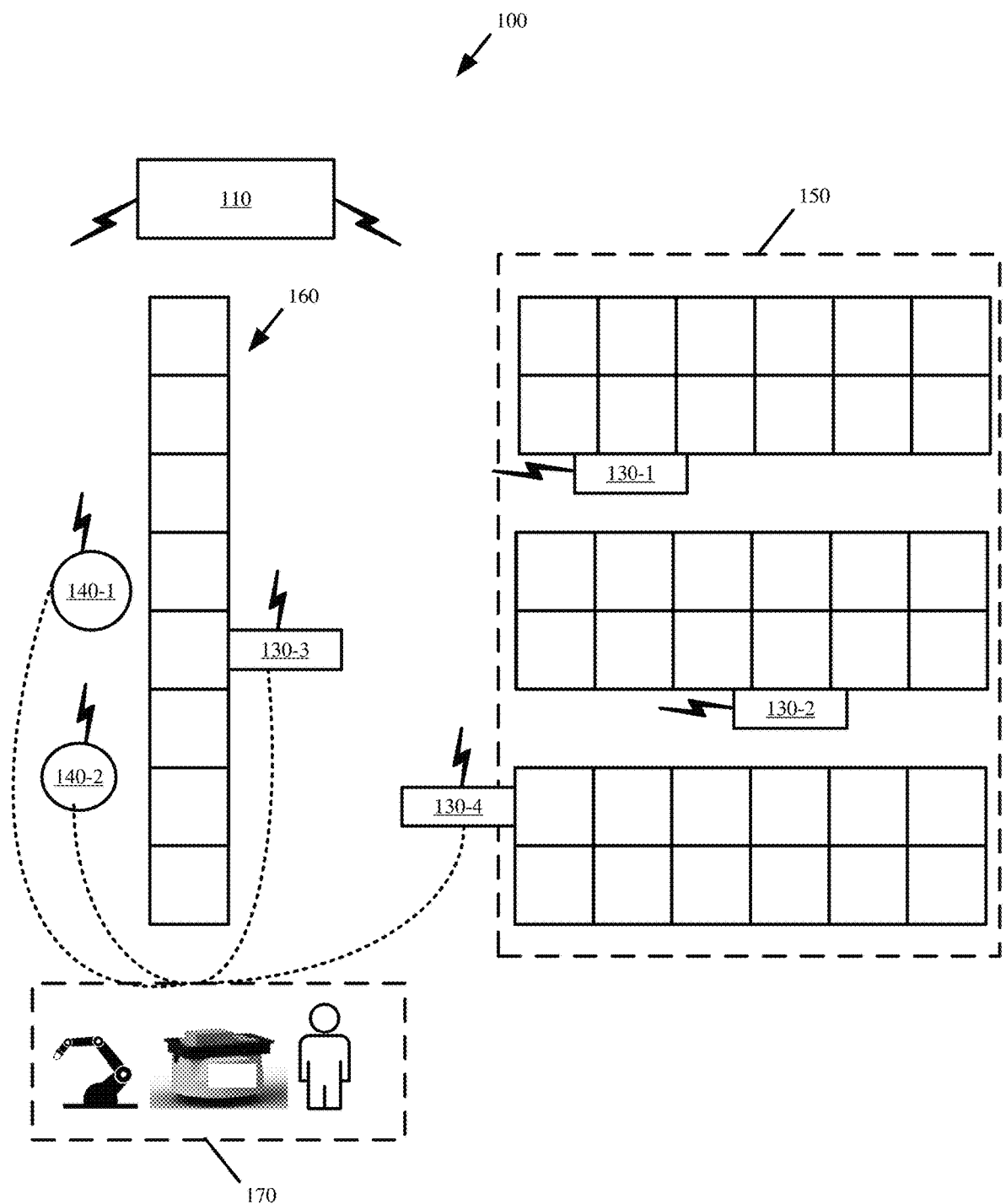
FIG. 1 illustrates an example environment in which one or more embodiments, described herein, may be implemented.

The following detailed description refers to the accompanying drawings. The same reference numbers in different drawings may identify the same or similar elements.

Disclosed are systems and methods for optimizing order fulfillment tasks and/or other tasks by orchestrating, controlling, and/or directing the operation of two different sets of actors in continuously performing different dependent sets of operations without operation execution by one set of actors delaying, interrupting, or otherwise impacting performance of the other set of actors. In particular, the systems and methods involve maximizing the saturation of at least two different sets of actors so that each set of actors continuously performs one of at least two dependent sets of operations at different rates over different but overlapping periods of time in a non-conflicting manner.

In some embodiments, the systems and methods monitor the different rates at which each set of actors performs their respective operations and/or accurately estimate the time to complete each operation of a pending set of operations based on past performance of an actor and parameters of the operation. The systems and methods may then coordinate, control, and/or direct each set of actors based on the monitored rates of operation so that each set of actors is fully saturated over different but overlapping periods of time, wherein a fully saturated actor continuously performs operations at the actor's maximum rate without delay, interference, or other impact from operations being performed by other actors despite the operations performed by the different actors being dependent on one another (e.g., a first operation cannot be executed until a second operation is first executed by another actor).

The disclosed systems and methods can be implemented in conjunction with a fully autonomous solution. The fully autonomous solution may include a site, a coordinator, a first set of robots, that perform a first set of operations relating to a first part of tasks pending execution (e.g., order fulfillment retrieval operations), and a second set of robots, that perform a second set of operations relating to a dependent second part of the tasks pending execution (e.g., order fulfillment packing operations). The fully autonomous solution involves using the first and second sets of robots to complete the order fulfillment tasks and/or other tasks without human involvement, and/or using the coordinator to keep the robots fully saturated despite the robots operating in the same space, operating at different rates, performing different dependent operations, and accessing the same resources (e.g., physical space, items, objects, etc.) in performance the operations.

In some embodiments, the coordinator may directly control the first and second sets of robots, or may direct operation of the first and second sets of robots via wireless messaging that is sent from the coordinator to the robots and/or via messaging the coordinator receives from the robots. Coordinator may control actuators and/or sensors of the robots to perform specific operations, or may provide instructions or commands from which the robot autonomously performs the operations. In any case, the coordinator may coordinate and/or control the different sets of actors to ensure that each actor is continuously performing operations at the optimal operational rate of that actor without idling, waiting, or otherwise being impacted by different rates or times at which other actors complete their operations, and/or the dependencies between the different sets of operations being performed by the other actors.

In some embodiments, the disclosed systems and methods can be implemented in conjunction with a partially autonomous solution. The partially autonomous solution may include a site, a coordinator, a set of robots performing one set of operations, and a set of humans performing another set of operations. For instance, the partially autonomous solution may be used for order fulfillment tasks because item retrieval operations may be more efficiently (e.g., with less overall cost) performed by the set of robots, whereas the packing operations may be more efficiently performed by the set of human workers. The partially autonomous solution may alternatively include a first set of actors with a mix of robots and human workers performing the retrieval operations, and a second set of actors with a different mix of robots and human workers performing the packing operations, whereby each set of actors is formed to optimally leverage experience, training, skills, and/or capabilities of each actor so that the actor can complete the most number of operations in the least amount of time with least cost to the site operator.

For the partially autonomous solution, the coordinator may control and/or direct the different sets of actors (e.g., robots and/or humans) for fully saturated and continuous operation at a rate and period of time at which each actor is available, and for fully saturated and continuous decoupled operation that is not impacted by different rates or times at which other actors complete their operations and/or different sets of operations being performed by the other actors under control and/or direction of the coordinator. The coordinator may wireless communicate with the robots and/or humans. Specifically, the coordinator may control or direct operations of the humans via messaging that is passed to a device carried by the human (e.g., a headset, watch, smartphone, tablet, or other wearable or mobile device), or a device that is near the human and that can be used to communicate with the human (e.g., a display, a laptop or desktop computer, an intercom system, and/or other stationary devices).

In some embodiments, the disclosed systems and methods can be implemented in conjunction with a solution that involves different sets of humans operating under control or direction of the coordinator. Some such embodiments may exclude robots altogether, or may include different shifts in which the actors are humans, robots, and/or some combination of both.

The disclosed systems and methods can be adapted for a variety of tasks including order fulfillment tasks, inventory replenishment tasks, item returns, and/or other tasks that involve at least two dependent sets of operations that can be performed with at least two sets of actors. For instance, the coordinator may divide available actors into a set of retrievers and a set of packers to separately complete retrieval operations and packing operations of pending order fulfillment tasks. The coordinator may account for the packing operations being dependent on the retrieval operations, and may further account for different capabilities, performance, operations, and/or factors that define the rate at which the set of retrievers complete different object retrieval operations, and that define the rate at which the set of packers complete order aggregation and packing operations. Coordinator may determine an optimal allocation of the operations that accounts for the operation dependencies and different actor performance characteristics, and that results in each set of actors continuously performing a different set of operations at different rates without delaying, interrupting, or otherwise impacting performance of the other set of actors.

FIG. 1 illustrates an example environment 100 in which one or more embodiments, described herein, may be implemented. Environment 100 may correspond to a warehouse, distribution center, or other site where order fulfillment and/or other tasks may be performed with at least two different sets of actors. Environment 100 may include coordinator 110, set of retrievers 130, set of packers 140, item storage 150, and item cache 160.

Coordinator 110 may include a centralized or distributed device that receives customer orders awaiting fulfillment or other tasks, and that coordinates, directs, or controls operations performed by set of retrievers 130 and set of packers 140. For instance, coordinator 110 may be communicably coupled or otherwise connected to a purchase order system, order management system, order fulfillment system, and/or other system or database where the order fulfillment tasks and/or other tasks are received or stored. Coordinator 110 may also be coupled or otherwise connected to an inventory management system or database that tracks available inventory of different items, and the location of the items in item storage 150. Coordinator 110 may coordinate, direct, and/or control set of retrievers 130, set of packers 140, and/or other actors operating in environment 100 via wireless messaging (e.g., data packets) that are sent to Internet Protocol ("IP") addresses or other identifiers used to wirelessly communicate with actors or devices used by the actors to communicate with coordinator 110.

The wireless messages may include commands, instructions, and/or data that coordinator 110 sends to the actors under its control or direction (e.g., set of retrievers 130 and set of packers 140), and/or input or data that the actors provide to coordinator 110. Coordinator 110 may use the actor provided input or data to track the status of different operations assigned to different actors for execution, and to track the movement of items and/or objects in the site. Coordinator 110 may also use the input to update inventory databases, order databases, etc. as the actors complete different pending tasks by successfully executing different sets of operations.

Coordinator 110 may include memory, a non-transitory storage medium, one or more processors, and/or network connectivity. Coordinator 110 may use these resources to control, coordinate, or otherwise direct operation of set of retrievers 130 and set of packers 140.

As shown in FIG. 1, set of retrievers 130 are comprised of retrievers 130-1, 130-2, 130-3, and 130-4 (herein sometimes collectively referred to as "retrievers 130" or individually as "retriever 130"). Each retriever 130 may be a robot or human that is selected from a set of available robots and/or humans 170. Although FIG. 1 illustrates four individual retrievers 130 (e.g., 130-1, 130-2, 130-3, and 130-4), set of retrievers 130 may include more or less retrievers 130 based on need, demand, and/or availability. For instance, the number of retrievers 130 may change depending on the number of retrieval operations that need to be completed in a day, the number of hours each retriever 130 is available in a day to perform retrieval operations, and the rate at which each retriever 130 completes one or more retrieval operations. The number of retrievers 130 may also change based in part on the number of packers 140, the rate at which packers 140 perform packing operations, and/or the number of hours that packers 140 are available in a day to perform packing operations.

In some embodiments, coordinator 110 may activate or deactivate one or more retrievers 130 and/or one or more packers 140 to adjust the size of each set of actors. In some other embodiments, coordinator 110 may monitor the number of daily tasks and the associated operations associated with each task. Coordinator 110 may also monitor the rate at which each set of actors performs one or more operations. Coordinator 110 may then determine a size of set of retrievers 130 and a size of set of packers 140 based on the number of tasks and/or effective rate at which each set of actors performs their respective set of operations.

The retrieval operations performed by each retriever 130 may include traveling throughout item storage 150 to the locations where different ordered or requested items are stored, retrieving the ordered or requested items from item storage 150, and transferring the ordered or requested items to item cache 160. Retrievers 130 may receive, from coordinator 110, commands and/or instructions that specify the locations of different ordered or requested items in item storage 150. Coordinator 110 may also specify as part of the commands and/or instructions a specific location about item cache 160 at which each retriever 130 is to place a retrieved item or object. In response to the provided commands and/or instructions, set of retrievers 130 may navigate within environment 100 to transfer requested items from item storage 150 to item cache 160.

In some embodiments, coordinator 110 may monitor the position of each retriever 130, may plot a path from the retriever current position to the location of an item in item storage 150, and may provide the path to a retriever 130 via wireless messaging. In some embodiments, coordinator 110 may provide one or more identifiers by which a retriever 130 can identify a requested item in item storage 150. The identifier may correspond to a fiducial, marker, Quick Response ("QR") code, or other visual feature at the location of the requested item.

Coordinator 110 may monitor operation of each retriever 130 based on input provided by each retriever 130 during the course of executing different retrieval operations. For instance, a retriever 130 may scan a first fiducial, marker, or other identifier of a retrieved item using a camera, scanner, or other sensor, and/or may scan a second fiducial, marker, or other identifier for the storage location where the item is retrieved. The retriever 130 may provide the first and/or second identifiers to coordinator 110 in order for coordinator 110 to track which items have been retrieved by that retriever 130. In some embodiments, the retriever 130 may also provide a third identifier that identifies the retriever 130. When a retriever 130 places an item at a particular location about item cache 160, the retriever 130 may provide coordinator 110 with a first identifier that identifies the retrieved item, and/or a second identifier that identifies the particular location about item cache 160 where the retrieved item is now located. Based on the identifiers provided by set of retrievers 130, coordinator 110 may track the positioning of the items as they are moved between item storage 150 and item cache 160.

As shown in FIG. 1, set of packers 140 are comprised of packers 140-1 and 140-2 (herein sometimes collectively referred to as "packers 140" or individually as "packer 140"). Each packer 140 may be a robot or human that is selected from the set of available robots and/or humans 170. Set of packers 140 may include different actors that have different training, capabilities, or capabilities than the actors of set of retrievers 130. In other words, packers 140 may be selected from available set of actors 170 based on their ability to efficiently perform packing operations, whereas retrievers 130 may be selected based on their ability to efficiently perform retrieval operations.

Environment 100 may include fewer packers 140 than retrievers 130 when set of packers 140 perform packing operations at a faster rate than set of retrievers 130 perform retrieval operations. As with the number of retrievers in set of retrievers 130, the number of packers in set of packers 140 may be based on demand, need, and/or availability, and more specifically the number of packing operations that need to be completed in a day, the number of hours each packer 140 is available in a day to perform packing operations, and the rate at which each packer 140 completes one or more packing operations.

The packing operations performed by set of packers 140 may include aggregating different items of a particular customer order in the correct quantities from items set of retrievers 130 have transferred to item cache 160. Accordingly, the packing operations performed by set of packers 140 may be dependent on the retrieval operations performed by set of retrievers 130 such that the retrieval operations can delay, interfere, or otherwise impact the packing operations performed by set of packers 140 if the retrieval operations are performed at a slower rate and are not correctly coordinated with the packing operations assigned to set of packers 140. The systems and methods disclosed herein include coordinator 110 accounting for the different rates at which each set of actors performs their respective operations in order to coordinate and/or control each set of actors so that each set of actors is fully saturated over different but overlapping periods of time each set of actors continuously performs their respective set of operations at their respective maximum rate without delaying, interfering, or otherwise impacting the execution of operations performed by the other set of actors despite the dependencies between the different sets of operations being executed by the different sets of actors.

Coordinator 110 may monitor operation of set of retrievers 130 to track items that have been transferred to item cache 160, and may assign packing operations to set of packers 140 for customer orders that can be fulfilled based on the items transferred to item cache 160. For instance, coordinator 110 may provide packer 140-1 with identifiers for a first subset of items at the item cache 160. The identifiers may include identifiers of the items, and/or identifiers corresponding to the item cache 160 location of those items. Each time packer 140-1 picks an item of the order, packer 140-1 may scan the identifier of the item using a camera, scanner, or other sensor, and may send the scan to coordinator 110 so that coordinator 110 may track completion of packing operations and/or order fulfillment tasks.

Item storage 150 may correspond to different aisles, mezzanines, or planes with different racks, tables, shelving, or other storage apparatuses that can be used to store different quantities of items. In particular, item storage 150 may include a plurality of storage locations that are distributed across each storage apparatus, and each storage location may be identified with a fiducial, marker, or other identifier. The storage location sizes need not be uniform, and can be larger or smaller to accommodate items and/or objects of different sizes or shapes. Coordinator 110, or a database that may be accessed by coordinator 110, may store an identifier-to-storage location mapping, and/or store an item identifier-to-location identifier mapping. These mappings identify which items or objects are stored at which storage locations. Coordinator 110 may also store a physical position of each storage location such that the storage location can be navigated to by an actor using the location identifier that is mapped to that storage location.

In some embodiments, the storage locations of item storage 150 may store totes, receptable, boxes, containers, or other objects that contain multiple units of a particular item or variations of the item (e.g., different sizes, colors, shapes, versions, etc.). Accordingly, some retrieval operations performed by set of retrievers 130 may include transferring an object with multiple units of an item from item storage 150 to item cache 160, and some packing operations may include picking a specified quantity of an item from an object at item cache 160. Some other packing operations may include picking a specified quantity of an item that can then be used to simultaneously fulfill the request for that item in multiple different orders. Some larger items may be stored as individual units at different storage locations of item storage 150. For simplicity, the retrieval and packing operations will be described with reference to items, but these descriptions can interchangeably refer to an individual item or an object storing multiples unit of one or more items.

Item cache 160 may include an aisle, rack, table, shelving, or other storage apparatus that holds fewer items or objects than item storage 150. Item cache 160 may be a single plane on which different items may be stored, or may be a rack that includes different planes (e.g., vertical shelves) on which different items may be stored. In any case, item cache 160 serves to localize the position of different items for different pending orders so that packers 140 travel significantly less in between packing items of different orders than if packing those same items from the storage locations in item storage 150. Additionally, at any given point in time, item cache 160 may be populated only with items of customer orders pending fulfillment, whereas item storage 150 may store all items that can be ordered.

Once items from an object at item cache 160 have been picked and used to fulfill one or more pending orders, coordinator 110 may dispatch a first retriever (e.g., retriever 130-1) to transfer that object from item cache 160 back to a storage location in item storage 150. Coordinator 110 may also dispatch a second retriever (e.g., retriever 130-2) to transfer another object containing items of one or more other pending orders from item storage 150 to item cache 160.

Like item storage 150, item cache 160 may include different storage locations that are identified with different fiducials, markers, or other identifiers. Item cache 160 may be simultaneously accessed by one or more retrievers 130, packers 140, and/or other actors.

Coordinator 110 may control, direct, and/or coordinate different sets of actors that operate at different rates to take advantage of different capabilities or specialization of the different sets of actors. For instance, set of retrievers 130 may include autonomous robots because the robots can continuously operate throughout the day (e.g., 24 hours a day) at a slow first rate to populate item cache 160 with items or objects based on orders received during business-hours and off-hours. Humans are less suitable for the retrieval operations because they can work for fewer hours in a day than a robot, and may tire after several traversals through item storage 150, whereas robots do not experience fatigue and can operate until they experience a failure or require recharging. However, humans may be more suited for packing operations because a high degree of dexterity, precision, and care may be needed to handle different items, and robots may lack the necessary dexterity, precision, and care, or because humans may be faster at performing the packing operations.

Accordingly, in some embodiments, set of packers 140 may include humans and/or robots that work for a fraction of the day (e.g., 8 hours a day), but that can complete packing operations at a fast second rate using items or objects already transferred to item cache 160 or replaced at item cache by set of retrievers 130 at the first rate. Set of retrievers 130 may work for a longer period of time, and may commence operation before set of packers 140 in order to fill item cache 160 with items for a first subset of packing operations, and may continue operating at the same time as set of packers 140 so that when set of packers 140 complete the first subset of packing operations at the second rate, set of retrievers 130 will have replaced unneeded items or objects from item cache 160 at the first rate with other items or objects for a second subset of packing operations yet to be performed by set of packers 140. In this manner, coordinator 110 may saturate both sets of actors (e.g., set of retrievers 130 and set of packers 140) for continuous operation over different periods of time at their respective maximum rate of operation while still ensuring that the slower execution of the retrieval operations does not delay, interfere, or otherwise impact the faster packing operations that are dependent on completion of the retrieval operations. In other words, coordinator 110 decouples the dependent set of operations while ensuring that both sets of actors operate at their different respective maximum rates without interruption.

FIGS. 2-7 illustrate an example of coordinator 110 saturating two sets of actors (e.g., set of retrievers 130 and set of packers 140) for continuous execution of different sets of dependent operations at different rates in order to maximize order fulfillment without conflict between the two sets of actors in accordance with some embodiments presented herein. Each of FIGS. 2-7 illustrates a different period of time as identified by timeline 210. The operations performed by each set of actors at each period of time is coordinated and/or controlled by coordinator 110.

To fully saturate each set of actors over different but overlapping periods of time spanned by timeline 210 in a manner that maximizes throughout (e.g., task execution or order fulfillment) and that eliminates one set of actors from delaying, interfering, or otherwise impacting operations of the other set of actors, coordinator 110 may track the rate at which each set of actors performs a respective set of operations. For instance, coordinator 110 may determine that set of retrievers 130 perform retrieval operations at a first rate that is slower than a second rate at which set of packers 140 perform packing operations. The rates may be based on capabilities and performance of each actor, but also the availability of the actors and the number of actors for a given set of actors under coordinator 110 control. The rates may be based on past monitored performance of each set of actors, and may be adjusted according to the current set of operations that pending execution. For instance, retrieving an item from a far end of item storage 150 is expected to take longer than retrieving an item from a near end of item storage 150. Coordinator 110 may also account for the different rates and also the limited availability of space at item cache 160 in coordinating and controlling operations of retrievers 130 and packers 140.

Figure 2:
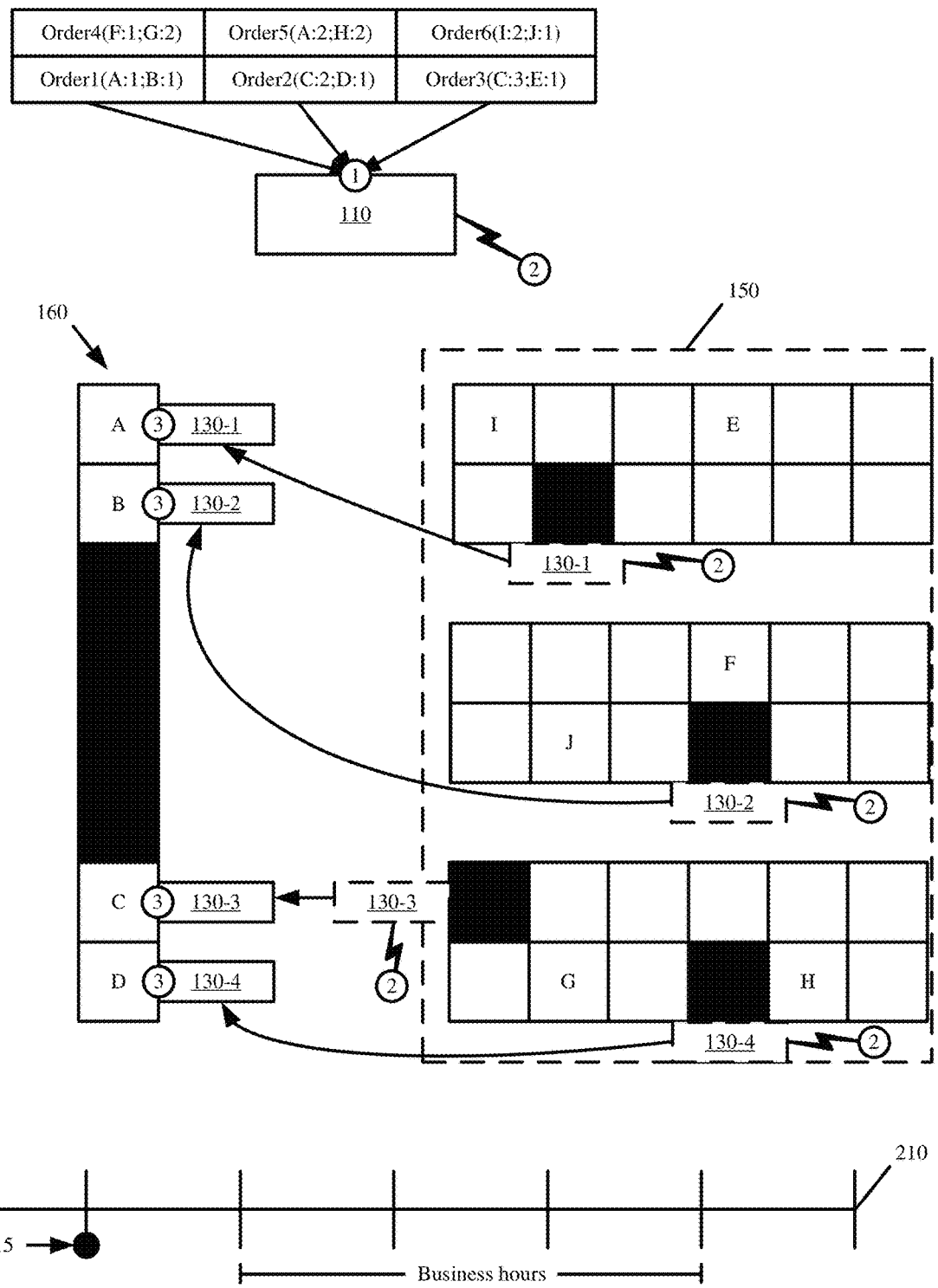
FIGS. 2-7 illustrate an example of a coordinator saturating two sets of actors to continuously perform different sets of operations at different rates in order to maximize order fulfillment without conflict between the two sets of actors in accordance with some embodiments presented herein FIG. 8 conceptually illustrates adjusting throughput by adjusting the size of an item cache in accordance with some embodiments presented herein.

In FIG. 2, coordinator 110 activates or commences operation of set of retrievers 130 at first period of time 215 to create a sufficient buffer of retrieved items at item cache 160, prior to expected operation of set of packers 140, via the first rate at which set of retrievers 130 operate. Coordinator 110 determines the time horizon needed to fill item cache 160 at the first rate with the available number of retrievers 130 based on past performance of retrievers 130, storage locations of the items in item storage 150, and/or the number of retrieval operations that are pending.

Figure 4:
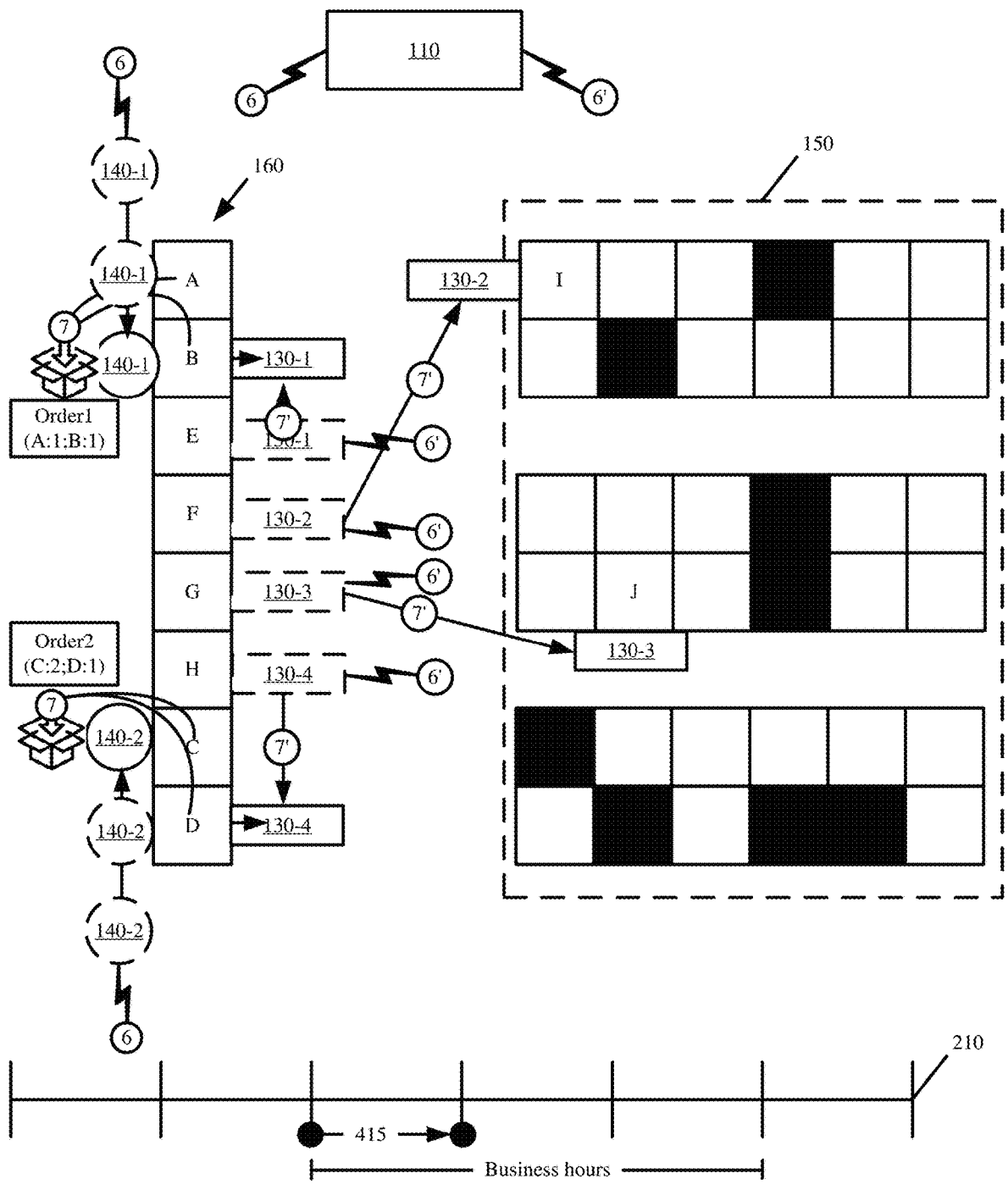

Once a sufficient buffer is created, coordinator 110 may activate or commence operation of set of packers 140 to perform packing operations at the second rate at third period of time 415 illustrated by FIG. 4, and may further coordinate and control operation of both sets of actors for overlapping periods of time 415-615 to allow both sets of actors to operate at their maximum rates. Specifically, in FIGS. 4-6, set of retrievers 130, via orchestrated control by coordinator 110, replace items at item cache 160 to stay ahead of set of packers 140, and to continuously provide items at item cache 160 for the packing operations performed by set of packers 140, that are dependent on the retrieval operations performed by set of retrievers 130, without delaying, interfering, or other impacting the operation of set of packers 140 throughout overlapping periods of time 415-615 during which both sets of actors are operational.

FIG. 2 illustrates first period of time 215, or a first shift, during which set of retrievers 130 may be available and operational, but set of packers 140 may be unavailable. For instance, first period of time 215 may correspond to an overnight shift or non-business hours. Set of retrievers 130 may operate at different times than set of packers 140, because the different sets of actors may perform their respective operations at different rates, and set of retrievers 130 may require additional time or shifts to complete all retrieval operations and/or to complete a sufficient number of dependencies before set of packers 140 may begin performing their respective operations.

As shown in FIG. 2, coordinator 110 may receive (at 1) a set of orders that are pending fulfillment. The set of orders may include orders that were received after some cutoff time. Each order of the set of orders may specify one or more items, and a quantity for each of the one or more items.

Coordinator 110 may direct (at 2) set of retrievers 130 to transfer (at 3) a first set of objects containing a subset of the ordered items from item storage 150 to item cache 160 during first period of time 215. In particular, coordinator 110 may saturate each retriever 130 with a continuous set of retrieval operations during first period of time 215, and each retriever 130 may continuously operate during first period of time 215 to transfer (at 3) one object from a storage location in item storage 150 to a specific location on item cache 160.

In particular, coordinator 110 may receive (at 1) an order, may determine the items of the order, may determine the locations of the items in item storage 150, may determine that the retriever execution rate permits for each retriever 130 to transfer (at 3) one item or object from item storage 150 to item cache 160 during first period of time 215, and may assign one or more retrievers 130 to transfer (at 3) the items from the determined locations in item storage 150 to item cache 160. For instance, retriever 130-1 may transfer (at 3) a container storing multiple units of item "A" from a first storage location to a first location on item cache 160, and retriever 130-2 may transfer (at 3) a container storing multiple units of item "B" from a second storage location to a different second location on item cache 160. It should be noted that FIG. 2 illustrates each retriever 130 transferring (at 3) a single item or object for purposes of simplicity. In reality, each retriever 130 may transfer (at 3) two or more items or objects over first period of time 215.

In some embodiments, directing (at 2) set of retrievers 130 may include coordinator 110 controlling the operation of different retrieval robots, wherein controlling the operation of a robot may include controlling movement of the robot to an item storage location, activating one or more actuators of the robot to retrieve the item or object containing the item from the storage location, controlling movement of the robot to item cache 160, and activating the one or more actuators to place the retrieved item to item cache 160. In some embodiments, directing (at 2) set of retrieves 130 may include coordinator 110 providing a retriever with one or more identifiers that the retriever can use to navigate to the item location in object storage 150, to identify the correct item about a set of items at the item location, and/or to transfer the item to a particular location or slot of item cache 160.

Figure 3:
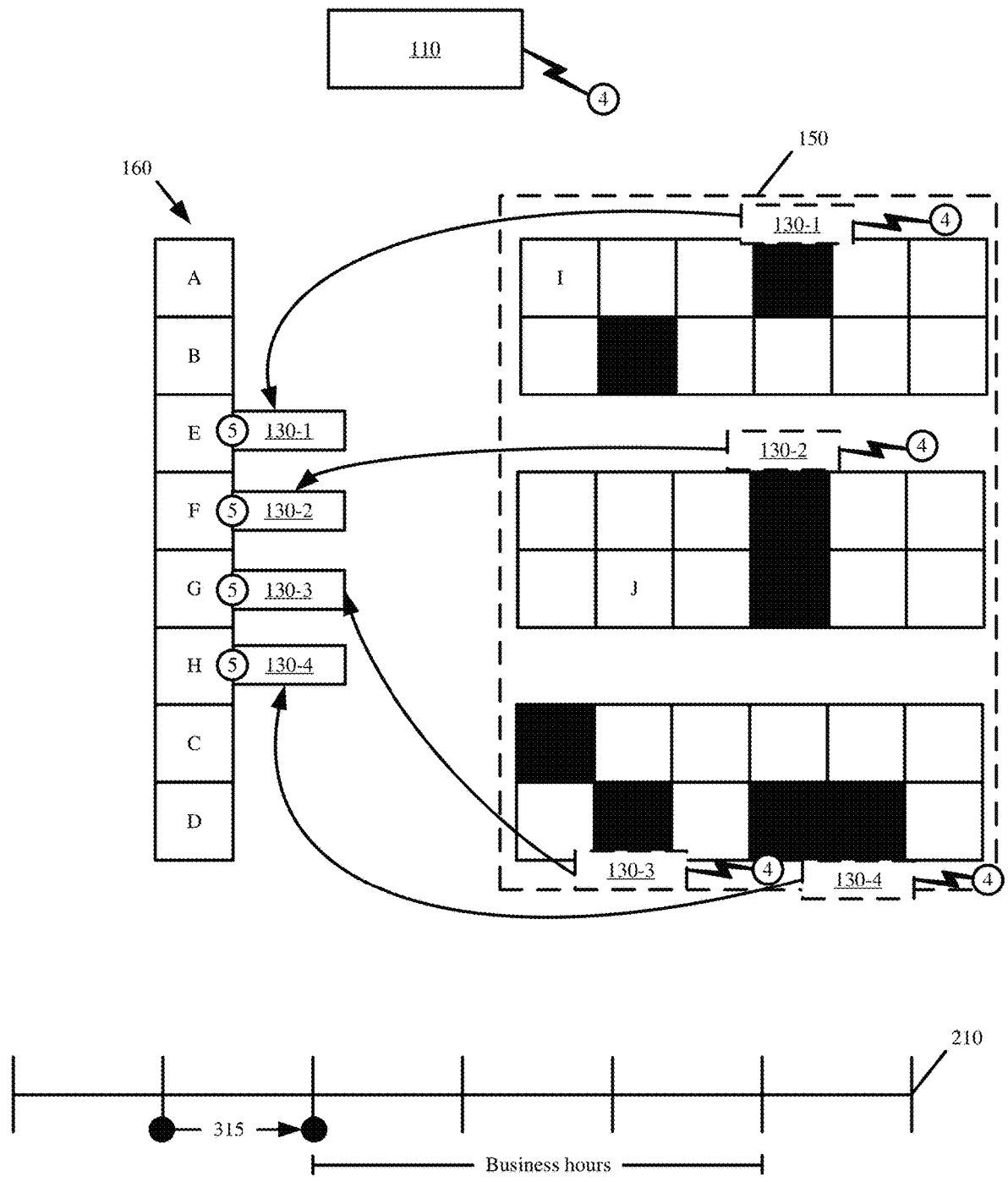

FIG. 3 illustrates second period of time 315 that comes after first period of time 215. During second period of time 315, set of retrievers 130 remain available and operational while set of packers 140 remain unavailable.

Coordinator 110 continues to saturate each retriever 130 during second period of time 315 by directing (at 4) set of retrievers 130 to transfer (at 5) a second set of objects containing a different subset of the ordered items from item storage 150 to item cache 160. For instance, retriever 130-1 may transfer (at 5) an object containing item "E", retriever 130-2 may transfer (at 5) an object containing item "F", retriever 130-3 may transfer (at 5) an object containing item "G", and retriever 130-4 may transfer (at 5) an object containing item "H" from item storage 150 to item cache 160 during second period of time 315.

At the end of second period of time 315, item cache 160 may be completely filled with items for a subset of received orders that are pending fulfillment. Coordinator 110 may determine that first and second periods of time 215-315 provide sufficient time for set of retrievers 130 to fill item cache 160 based on the tracked first rate at which set of retrievers 130 operate and a size of item cache 160. Moreover, coordinator 110 may determine that filling item cache 160 creates a sufficient buffer that allows both sets of actors to be fully saturated going forward with set of packers 140 commencing packing operations at the start of third period of time 415, and with set of packers 140 performing packing operations at the faster second rate while set of retrievers 130 replace items about item cache 160 at the slower first rate to continually provide the items needed for subsequent packing operations of set of packers 140.

FIG. 4 illustrates third period of time 415, that comes after second period of time 315, where set of retrievers 130 and set of packers 140 are both available for performing different dependent sets of operations related to the same order fulfillment tasks. As shown in FIG. 4, set of retrievers 130 may continue to include four retrievers 130-1, 130-2, 130-3, and 130-4, while set of packers 140 includes two packers 140-1 and 140-2.

To fully saturate set of packers 140 during third period of time 415, coordinator 110 may direct (at 6) each packer 140 in aggregating (at 7) items for a different order from the objects that set of retrievers 130 have already transferred to item cache 160. For instance, coordinator 110 may assign a first order to first packer 140-1, and first packer 140-1 moves between neighboring objects at item cache 160 to pick and group (at 7) one unit of item "A" with one unit of item "B", and thereby fulfill the first customer order during third period of time 415. Similarly, coordinator may direct (at 6) second packer 140-2 in picking and grouping (at 7) one unit of item "C" and one unit of item "D" in order to fulfill the second customer order during the third period of time 415. As shown, set of packers 140 perform the packing operations using the objects and/or items that were previously transferred to item cache 160 by set of retrievers 130 such that the packing operations performed by set of packers 140 are decoupled from the retrieval operations being performed by set of retrievers 130 during third period of time 415, even though the packing operations cannot be completed until a first set of the retrieval operations are completed.

Coordinator 110 may also continue saturating set of retrievers 130 during third period of time 415 with additional retrieval operations. Since item cache 160 is now full, coordinator 110 may coordinate and/or control set of retrievers 130 in replacing items at item cache 160 that are no longer needed with items for other received (at 1) orders pending fulfillment. For instance, coordinator 110 may determine, based on the received (at 1) orders, that the objects, that have been transferred to item cache 160 and that store items "B" and "D", are not needed to fulfill any other pending orders after fulfilling the first and second orders. Accordingly, once set of packers 140 have picked the desired items from these objects, the objects can be removed from item cache 160 and replaced with other objects that store items for other orders pending fulfillment. Therefore, coordinator 110 may direct (at 6') retriever 130-1 to move (at 7') to the location about item cache 160 where the container storing item "B" is placed, retriever 130-2 to move (at 7') to a storage location in item storage 150 where a next ordered item (e.g., item "I") is stored, retriever 130-3 to move (at 7') to the location in item storage 150 where the object storing item "J" is located, and retriever 130-4 to move (at 7') to the location about item cache 160 where the object storing item "D" is located.

In some embodiments, the number of unneeded items at item cache 160 (e.g., items that have been accessed by packers 140 and that need to be replaced with items of other pending orders) may exceed the number of retrievers 130 available to replace the items. In some such embodiments, coordinator 110 may prioritize the replacement of the unneeded items based on different criteria.

For instance, coordinator 110 may use a Least Recently Used ("LRU") or a Least Frequently Used ("LFU") algorithm to select which of the unneeded items to replace first from item cache 160. In this instance, coordinator 110 directs retrievers 130 in replacing the unneeded items with the longest time since the last access, the items that have been requested by or used to fulfill the least number of customer orders, or the items that have been at item cache 160 for the longest period of time.

Alternatively, coordinator 110 may selectively replace the unneeded items that are closest to the current positions of retrievers 130. Coordinator 110 may use this positioning criteria to minimize the time retrievers 130 spend at item cache 160, the overall distance retrievers 130 move about item cache 160, and the potential for conflict with other actors accessing item cache 160.

In some embodiments, coordinator 110 may perform a look-ahead operation to determine if any of the unneeded items are requested for future orders that are pending fulfillment, and coordinator 110 may selectively retain these items at the item cache 160 and may selectively replace other unneeded items that are not used to fulfill any future or pending orders. In some embodiments, coordinator 110 may perform a predictive look-ahead operation. For instance, coordinator 110 may use artificial learning or machine learning to detect trends as to when certain items are requested, the frequency of items being requested, the demand for different items, relationships between a current set of ordered items and future ordered items, and/or other metrics related to the probability that an unneeded item will be requested as part of a future customer order. Coordinator 110 may then selectively retain the unneeded items (e.g., items that are not needed to fulfill any of a current set of pending orders) with the highest probability of being requested in a future order (e.g., a customer order that has yet to be received), while selective replacing the unneeded items with lowest probability of being requested in a future order.

Coordinator 110 may direct retrievers 130 in replacing items from item cache 160 according to one or more of these and other replacement criteria. Additionally, coordinator 110 may switch between different replacement criteria throughout the day.

Figure 5:
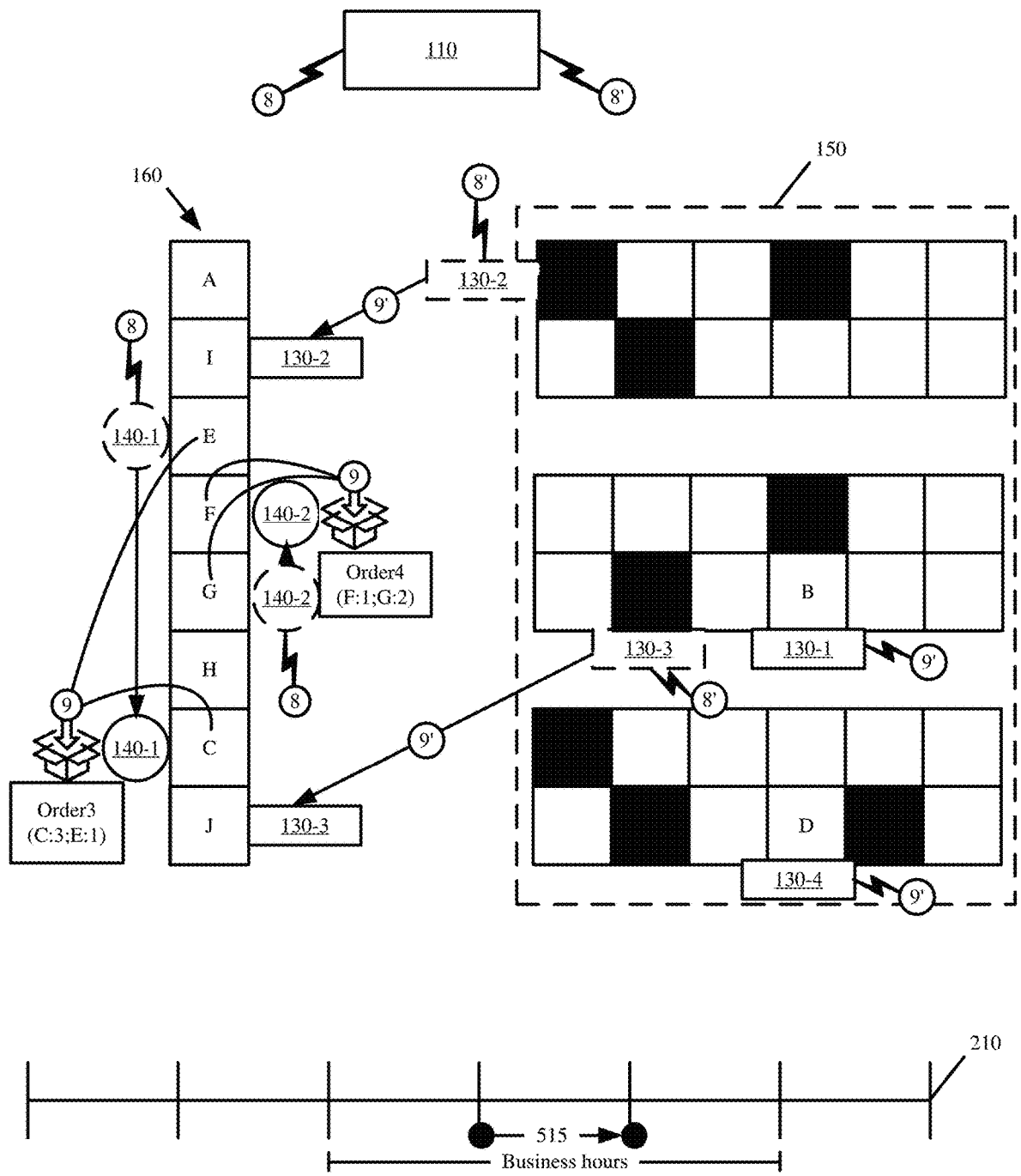

At the end of third period of time 415, set of packers 140 may have completed the packing operations to fulfill the first customer order with one unit of item "A" and one unit of item "B", and to fulfill the second customer order with one unit of item "C" and one unit of item "D". As shown in FIG. 5, coordinator continues to saturate both sets of actors during a next fourth period of time 515 by directing (at 8) packers 140 to pick and group (at 9) requested items for third and fourth customer orders, and by directing (at 8') retrievers 130 in replacing (at 9') in replacing unneeded objects storing items "B" and "D" from item cache 160.

Throughout the order fulfillment process illustrated thus-far, coordinator 110 has decoupled the operations performed by the different sets of actors so that the operations being performed by one set of actors during a particular period of time is not delayed, impacted, or otherwise impacted by the set of operations being performed by the other set of actors at that particular period of time. Specifically, coordinator 110 accounted for the performance and rate at which the different sets of actors performed their respective sets of operations to keep the different sets of actors saturated throughout the order fulfillment process while allowing each set of actors to execute operations at their respective maximum rate. Thus, even though set of retrievers 130 replace the items of item cache 160 at the slower first rate, and the items at item cache 160 are needed by set of packers 140 to perform the packing operations, coordinator 110 created a sufficient buffer via retrieval operations performed during first and second periods of time 215-315 to allow set of packers 140 to continuously operate at the faster second rate using results of the retrieval operations performed by set of retrievers 130 at the slower first rate without being impacted by the slower operation of set of retrievers 130.

Figure 6:
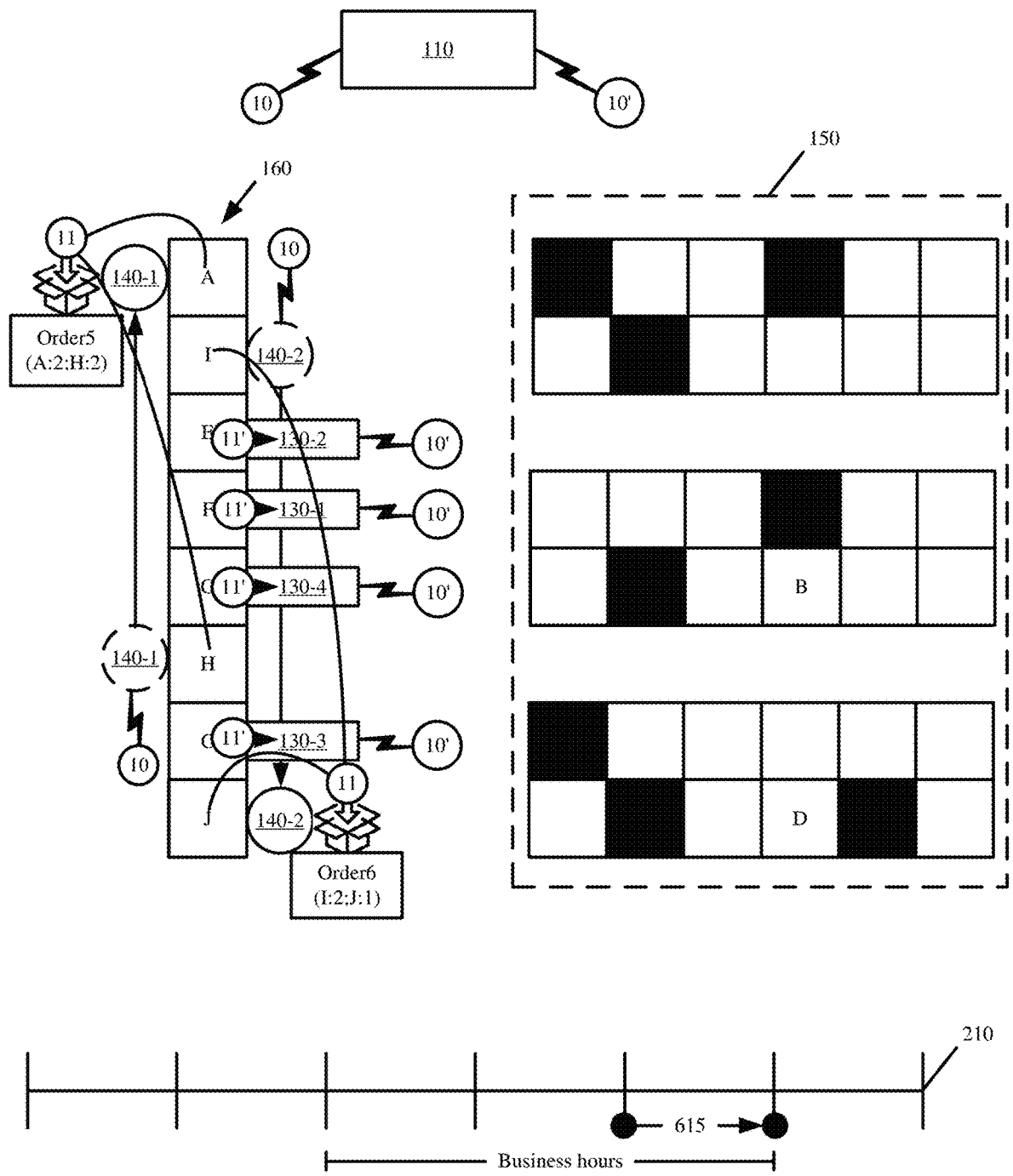

FIG. 6 illustrates the continued saturation of set of retrievers 130 and set of packers 140 with decoupled sets of operations over fifth period of time 615. As shown in FIG. 6, coordinator 110 directs (at 10) set of packers 140 in picking and grouping (at 11) items from item cache 160 that are needed to fulfill the fifth and sixth customer orders, wherein items "I" and "J" used to fulfill the fifth and sixth customer orders were transferred to item cache 160 by set of retrievers 130 during fourth period of time 515 to avoid delaying, interrupting, or otherwise impacting the packing operations of set of packers 140 during fifth period of time 615.

Figure 7:
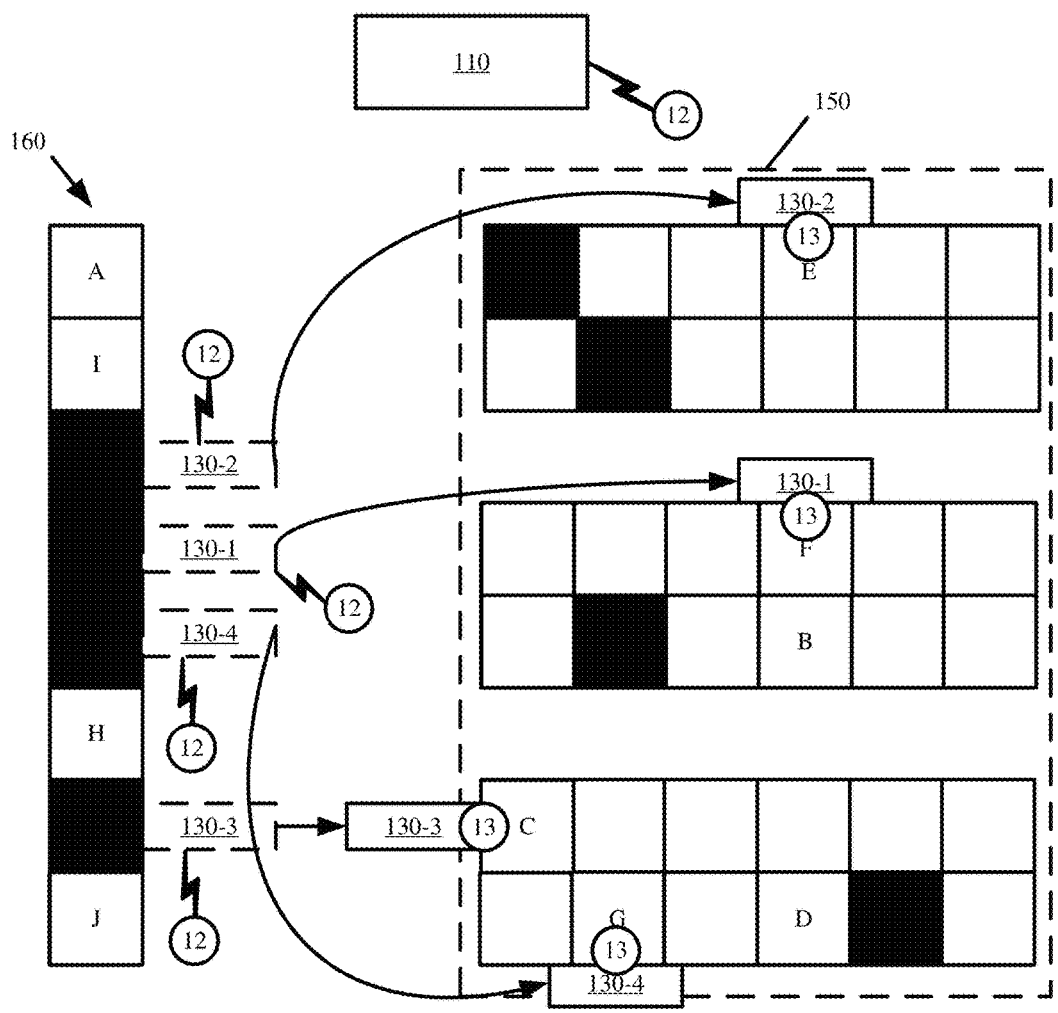
Figure 7:
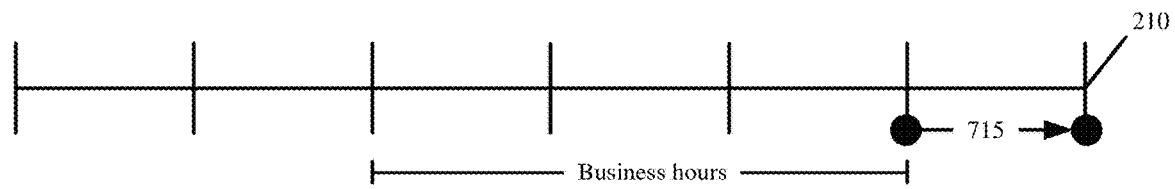

Contemporaneously, coordinator 110 directs (at 10') set of retrievers 130 in performing additional retrieval operations to retrieve (at 11') unneeded objects or items from item cache 160, and to begin clearing out item cache 160 as a result of having transferred the items that were needed to fulfill the orders for that day or shift. FIG. 7 illustrates coordinator 110 directing (at 12) set of retrievers 130 in returning (at 13) the items or objects retrieved from item cache 160 to item storage 150. For instance, set of retrievers 130 may begin emptying (at 11' and 13) item cache 160 towards the end of the workday so that it can be repopulated with objects or items for the following workday based on newly received orders that are to be fulfilled during the following workday. Coordinator 110 may continue to saturate set of retrievers 130 to complete the remaining retrieval operations. In particular, coordinator 110 may direct or control set of retrievers in returning the remaining objects or items from item cache 160 to item storage 150.

FIGS. 2-7 illustrate the different rates and times at which set of retrievers 130 and set of packers 140 perform dependent sets of operations for a set of common tasks. Moreover, the figures illustrate coordinator 110 orchestrating control of the different sets of actors in order to fully saturate the different sets of actors over different overlapping periods of time so that each set of actors can continuously perform one of the dependent set of operations at their maximum rate of operation without delaying, interrupting, or otherwise impacting continuous execution of the other set of operations at a different rate by the other set of actors.

Coordinator 110 may optimize task execution using one or more controllable variables within environment 100. For instance, the number of hours that each actor can work may be fixed, or the rate at which the actors execute operations may be fixed. However, coordinator 110 may optimize task execution by increasing or decreasing the number of actors that are used to perform the different sets of operations for the pending tasks. In particular, when set of retrievers 130 or set of packers 140 include one or more robots, coordinator 110 may activate or deactivate one or more the robots based on demand. Another optimization may include adjusting the size of item cache 160.

Figure 8:
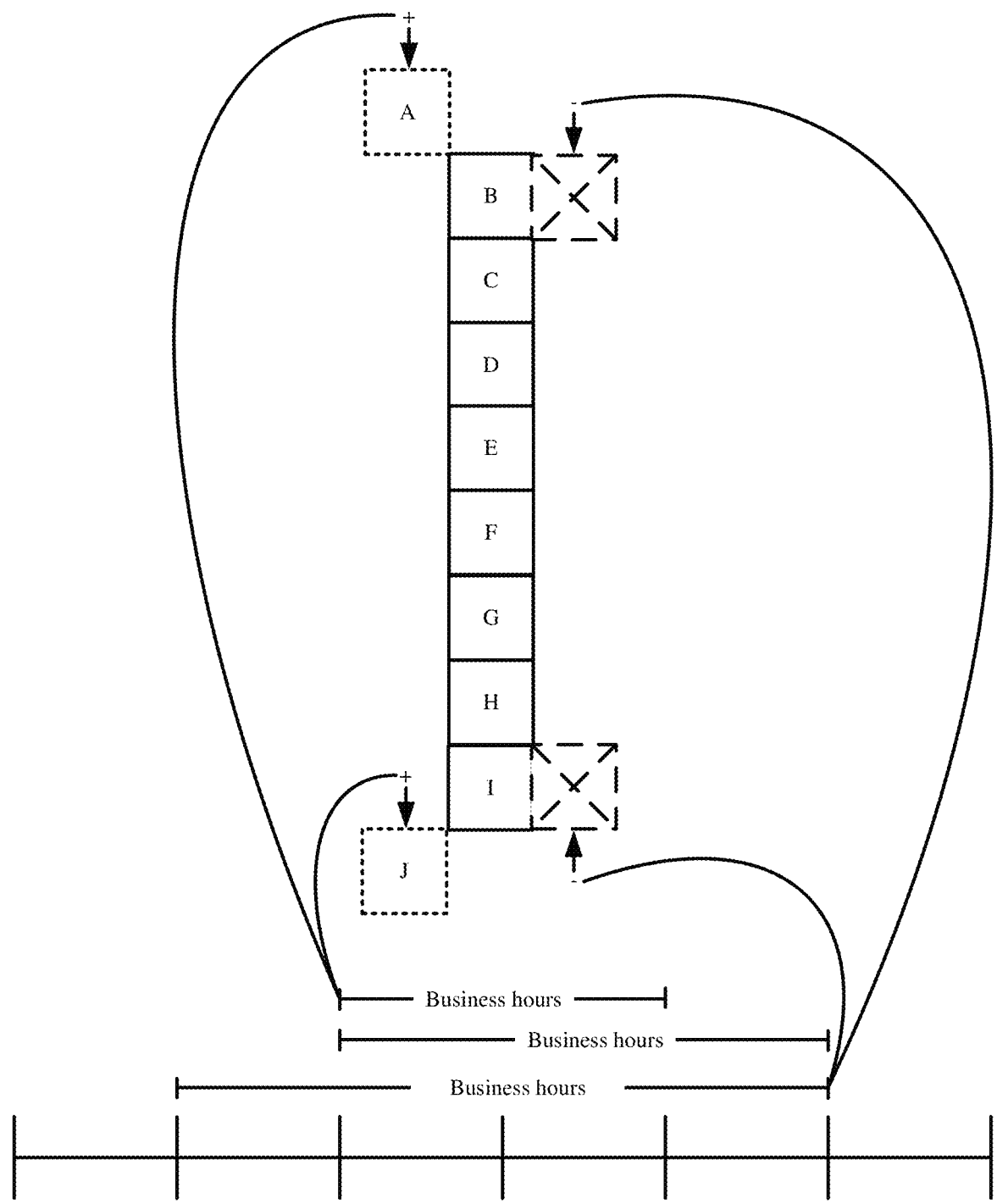

FIG. 8 conceptually illustrates adjusting throughput by adjusting the size of item cache 160 in accordance with some embodiments presented herein. The size of item cache 160 may affect the number of items or objects that set of retrievers 130 can make available to set of packers 140, and the number of items or objects that set of packers 140 can pick from during one traversal of item cache 160. When set of packers 140 can pick from a larger number of items or objects, set of packers 140 may be able to complete more packing operations, and thereby fulfill more orders, during a single traversal of item cache 160 than when fewer items or objects are stored at item cache 160. Stated differently, a larger item cache 160 may contain a larger selection of items or objects, thereby allowing each packer 140 to pick and group items of more than one order during each traversal of item cache 160.

In some embodiments, coordinator 110 may logically adjust the size of item cache 160. In some such embodiments, item cache 160 may be a physical storage apparatus that may have a fixed size and that may accommodate a maximum number of items or objects because of the fixed size. Coordinator 110 may logically adjust the size of item cache 160 by changing the number of slots that are populated with retrieved objects or items at any given time.

In some embodiments, coordinator 110 may physically adjust the size of item cache 160 by allocating additional or fewer racks, aisle, shelving, tables, and/or other storage apparatuses for the purpose of storing objects or items for pending orders. For instance, coordinator 110 may dynamically repurpose a rack from item storage 150 to serve as an additional item cache 160.

Figure 9:
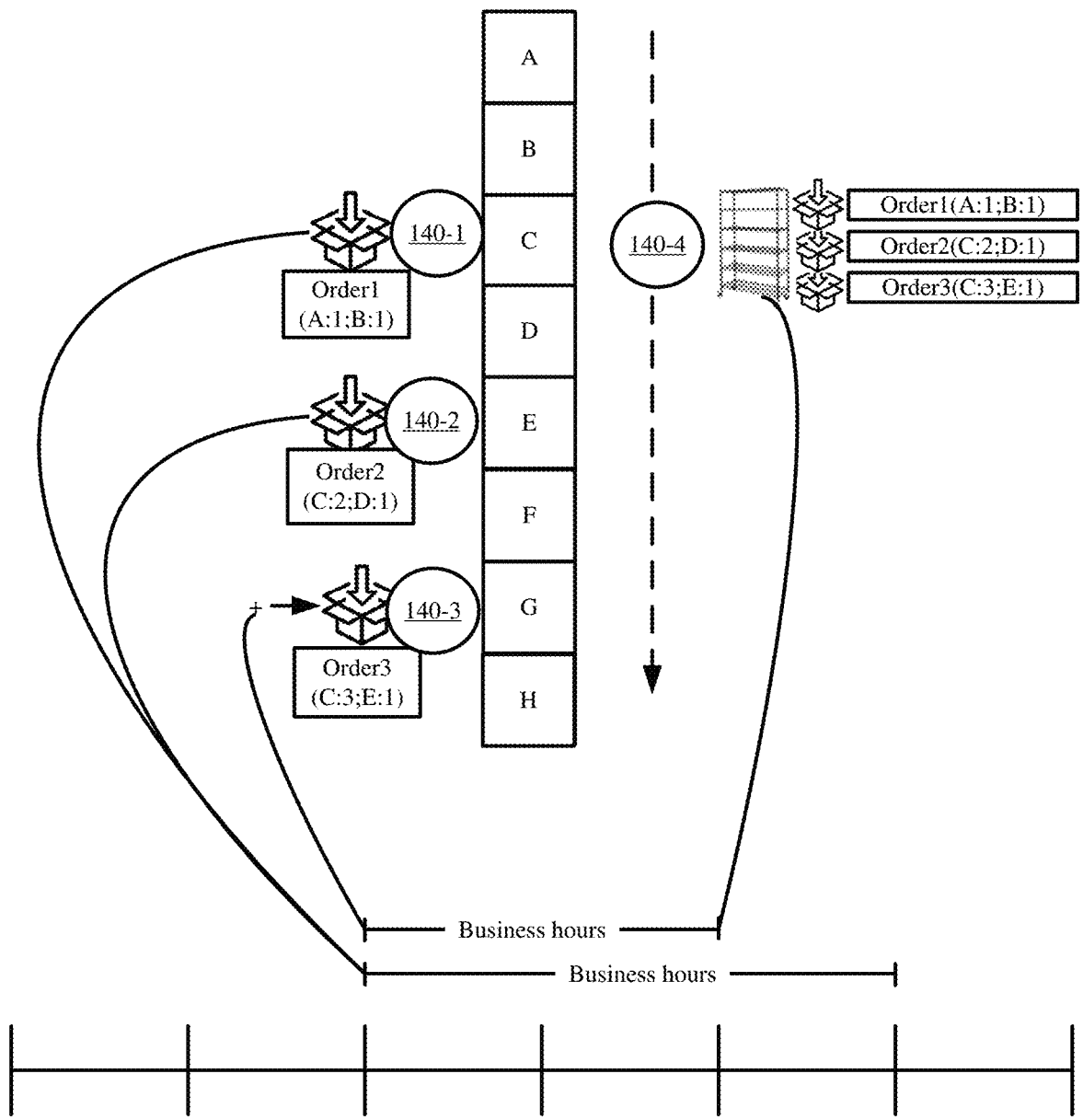
FIG. 9 illustrates adjusting system throughput by adjusting the number of operations an actor can complete in a particular period of time.

FIG. 9 illustrates adjusting system throughput by adjusting the number of operations an actor can complete in a particular period of time. As shown in FIG. 9, two packers 140-1 and 140-2 may have an effective rate of completing two orders per period of time, and three packers 140-1, 140-2, and 140-3 may have an increased effective rate of completing three orders per period of time.

Coordinator 110 may achieve the same throughput by controlling a single packer 140-4 in picking and grouping items for multiple orders during the same period of time or traversal of item cache 160. In fact, allocating packer 140-4 to perform packing operations for multiple orders at one time may be more efficient than using multiple packers 140 since the different orders may request or include some of the same items that packer 140-4 will be picking and grouping for another customer order. In some such embodiments, coordinator 110 may provide packer 140-4 with item identifiers for items of three different orders that packer 140-4 is to fulfill during a single traversal of item cache 160. Packer 140-4 may then use a moveable rack to pick and group items of the three different orders, and thereby achieve the same throughput as packers 140-1, 140-2, and 140-3 picking and grouping items for a single order during each traversal of item cache 160.

FIGS. 2-7 illustrate an in-order fulfillment of the received customer orders. In-order fulfillment may be less efficient than an out-of-order fulfillment of the received customer orders, because an in-order fulfillment may cause retrievers 130 to transfer a particular item for a first order to item cache 160, remove the particular item from item cache 160 to make room for another item for a second order, and transfer the particular item from item storage 150 back to item cache 160 to fulfill a subsequent third order that is not received immediately before or after the first order.

Coordinator 110 may optimize the throughput of the different sets of actors by coordinating an out-of-order fulfillment of orders instead of the in-order fulfillment illustrated in FIGS. 2-7 above. Using the out-of-order fulfillment, coordinator 110 can reduce the number of retrieval operations that are performed by set of retrievers 130 as well as the number of separate picks from the particular item by one or more packers 140. For instance, continuing with the example above, coordinator 110 may detect that the first and third orders both request at least one unit of the particular item, and may fulfill the first and third orders at the same time rather than have different packers move to the particular item on item cache 160 at different times or as part of different traversals of item cache 160. The out-of-order optimization performed by coordinator 110 may therefore result in a single retriever 130 transferring the particular item to item cache 160 one time, rather than in the non-optimized example where the particular item is transferred to item cache 160 at two separate times. The out-of-order fulfillment also allows a single packer 140 to pick requested quantities of the particular item for the first order and the third order at one time and one traversal through item cache 160, whereas an in-order fulfillment would require a first packer 140 picking and grouping the particular item for the first order at a first time with a first traversal through item cache 160, and a second packer 140 picking and grouping the particular item for the third order at a later second time with a second traversal through item cache 160.

Figure 10:
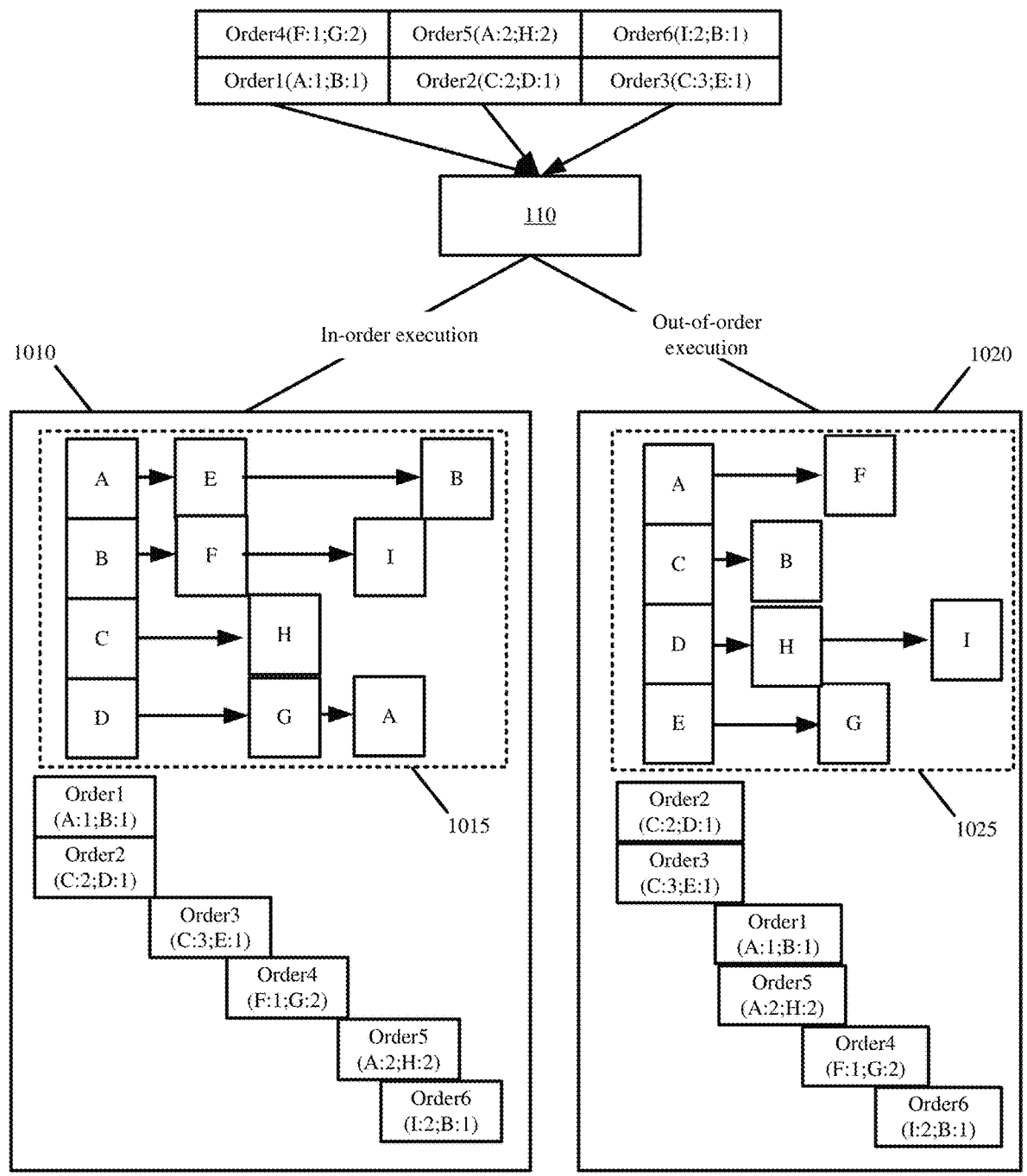
FIG. 10 conceptually illustrates the coordinator reordering decoupled sets of operations performed by different sets of actors in accordance with some embodiments presented herein.

FIG. 10 conceptually illustrates coordinator 110 reordering decoupled sets of operations performed by different sets of actors to increase productivity and efficiency of the different sets of actors without delaying, interrupting, or otherwise impacting the continuous execution of operations by either set of actors at their respective maximum rates in accordance with some embodiments presented herein. FIG. 10 illustrates first set of operations 1010 for in-order fulfillment and optimized second set of operations 1020 for out-of-order fulfillment of the same set of orders.

First set of operations 1010 includes retrieval operations 1015 that are performed by set of retrievers 130 at different times to populate item cache 160 with different items for fulfilling the customer orders in the order that they are received. As shown, retrieval operations 1015 include duplicative retrieval operations for transferring items "A" and "B" or objects containing items "A" and "B" to item cache 160 at two different times.

First set of operations 1010 also illustrates the packing operations that are performed by set of packers 140 at different times to pick and group items of pending orders from item cache 160 based on the in-order retrieval of items. Since the orders are fulfilled in-order, the picking of item "A" from item cache 160 is performed once for the first customer order, and repeated at a later time for the fifth customer order. Similarly, the picking of item "B" is performed once for the first customer order, and is repeated at a later time for the sixth customer order. Accordingly, even though set of retrievers 130 and set of packers 140 are fully saturated and continuously performing operations throughout the time it takes to fulfill the pending orders, the time to fulfill the orders and the number of operations performed to fulfill the orders are greater because of the in-order fulfillment than the out-of-order fulfillment illustrated by second set of operations 1020.

Second set of operations 1020 include reordered retrieval operations 1025. As a result of reordered retrieval operations 1025, the items for all six customer orders are only transferred to item cache 160 one time by set of retrievers 130. Reordered retrieval operations 1025 include a total of nine retrievals, whereas in-order retrieval operations 1015 include a total of eleven retrievals for fulfilling the same set of orders.

The out-of-order fulfillment also reduces the number of packing operations, the number of separate picks, or the number of traversals through item cache 160 that are performed by set of packers 140. For instance, second set of operations 1020 includes four traversals of item cache 160 while first set of operations 1010 includes five traversals of item cache 160. Second set of operations 1020 involves ten separate picks to fulfill the six customer orders, whereas first set of operations 1010 involves twelve separate picks to fulfill the same six customer orders. For instance, second set of operations 1020 demonstrate that a packer 140 may perform picks of items "C", "D", and "E" to fulfill second and third customer orders during a first traversal of item cache 160 (e.g., three separate picks), may perform picks of items "A", "B", and "H" during a second traversal of item cache 160 (e.g., three additional picks), may perform picks of items "F" and "G" during a third traversal of item cache 160, and may perform picks of items "I" and "B" during a fourth traversal of item cache 160.

In some embodiments, coordinator 110 may perform an out-of-order fulfillment to prioritize certain orders over other orders rather than to batch orders based on common items. For instance, coordinator 110 may scan the received set of orders, and may detect a first subset of orders with one-day shipping and a second subset of orders with two-day shipping. In this case, coordinator 110 may perform an out-of-order fulfillment to prioritize retrieval of items for the first subset of orders to item cache 160 before items for the second subset of orders. In other words, coordinator 110 may batch the first subset of orders so that the items of these orders are transferred to item cache 160 before items of other orders. Coordinator 110 may further optimize the out-of-order fulfillment by reordering the retrieval of items in the first subset of orders to batch orders in the first subset of orders that request common items.

Coordinator 110 may provide other optimizations to increase productivity and/or the number of executed tasks while continuing to saturate different sets of actors with decoupled sets of operations. For instance, in addition to reordering or batching together orders or tasks that involve the same items to reduce repeating the same operations at different times, coordinator 110 may adjust the placement of items or objects at item cache 160 to minimize the distance that separates different items or objects used to fulfill the same order or task. By minimizing the distance separating different items of the same order, coordinator 110 reduces the amount of time that packers 140 spend moving about item cache 160, and thereby increases the time packers 140 spend picking and grouping items of different orders. Moreover, the minimized distance may also reduce the number of collisions between different packers 140 accessing different items from different locations about item cache 160.

Figure 11:
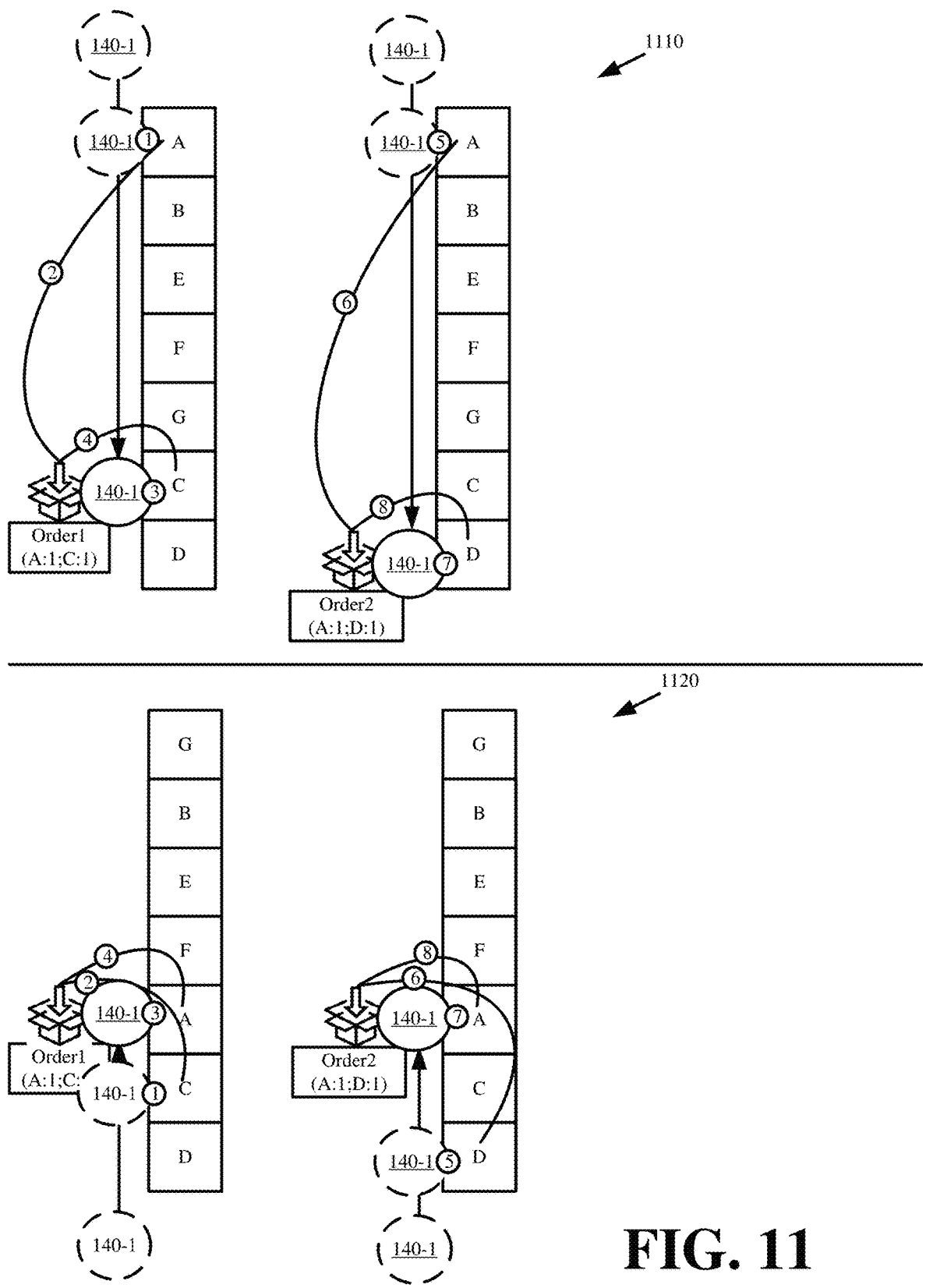
FIG. 11 illustrates an example of the coordinator optimizing placement of items about an item cache in accordance with some embodiments.

FIG. 11 illustrates an example of coordinator 110 optimizing placement of items about item cache 160 to increase packer 140 efficiency during continuous execution of a decoupled set of operations assigned by coordinator 110 in accordance with some embodiments. In this figure, coordinator 110 tasks packer 140-1 with picking and grouping items "A" and "C" for a first order, and items "A" and "D" for a second order during separate traversals of item cache 160.

FIG. 11 illustrates suboptimal placement 1110 of the items about item cache 160, and optimal placement 1120 of the same items about item cache 160. Suboptimal placement 1110 may result from coordinator 110 directing set of retrievers 130 to place items or objects retrieved from item storage 150 in a first available or any available slot of item cache 160. Optimal placement 1120 may result from coordinator 110 inspecting the received set of orders, determining the most efficient placement of the items for the orders at item cache 160, and controlling set of retrievers 130 in placing the retrieved items or objects to specific locations about item cache 160, wherein the most efficient placement minimizes the total distance between different items of the same order about item cache 160, and/or minimizes the total distance for packing items of all orders pending fulfillment.

To fulfill first order and second order via suboptimal placement 1110, packer 140-1 retrieves item "A" for first and second order from one end of item cache 160 before moving to the opposite end of item cache 160 to retrieve the second item (e.g., item "C" or item "D") for first and second orders. Movement from one end to the other end of item cache 160 takes time that packer 140-1 could otherwise devote to picking, packing, and/or grouping items. The amount of time can become significant over the course of a day, when item cache 160 is of a large size, or when the items are large or heavy and require packer 140-1 to move slowly and/or carefully across item cache 160. The amount of time can also increase if other packers 140 simultaneously access item cache 160, and packer 140-1 has to move around or avoid obstacles created by other packers 140 when moving from one end of item cache 160 to an opposite end.

Optimal placement 1120 has the three items of first and second orders located adjacent to one another on item cache 160, such that packer 140-1 can spend more time picking, packing, and/or grouping the items for the orders, and less time moving about item cache 160. Optimal placement 1120 also reduces the likelihood of different packers 140 coming into conflict with one another as one packer 140 can perform picking and grouping operations at one end of item cache 160 without interference, and another packer 140 can perform picking and grouping operations at another end of item cache 160 without interference.

Coordinator 110 can further optimize the operations for more efficient completion by aligning locations of items on item cache 160 with locations of the corresponding order being fulfilled on a rack or other storage apparatus used by packer 140 to fulfill one or more orders. For instance, item cache 160 may have shelves at different vertical heights, and packer 140 may use a rack with shelves that are aligned with the vertical heights of item cache 160 to pack store boxes for packing different customer orders during one traversal of item cache 160. In this example, coordinator 110 may direct retrievers 130 in placing different retrieved items of a first order on the topmost shelf of item cache 160 and different retrieved items of a second order on the bottommost shelf of item cache 160. Similarly, coordinator 110 may instruct packer 140 to place a first box on the topmost shelf of the rack, to use the first box to aggregate items of the first customer order, to place a second box on the bottommost shelf of the rack, and to use the second box to aggregate items of the second customer order. Such alignment lowers the cognitive overhead of packer 140. In particular, packer 140 can simply pick items of the first customer order from the topmost shelf of item cache 160, and transfer those items to the first box on the topmost shelf of the rack without have to search the rack to determine where to aggregate the items of the first customer order.

Figure 12:
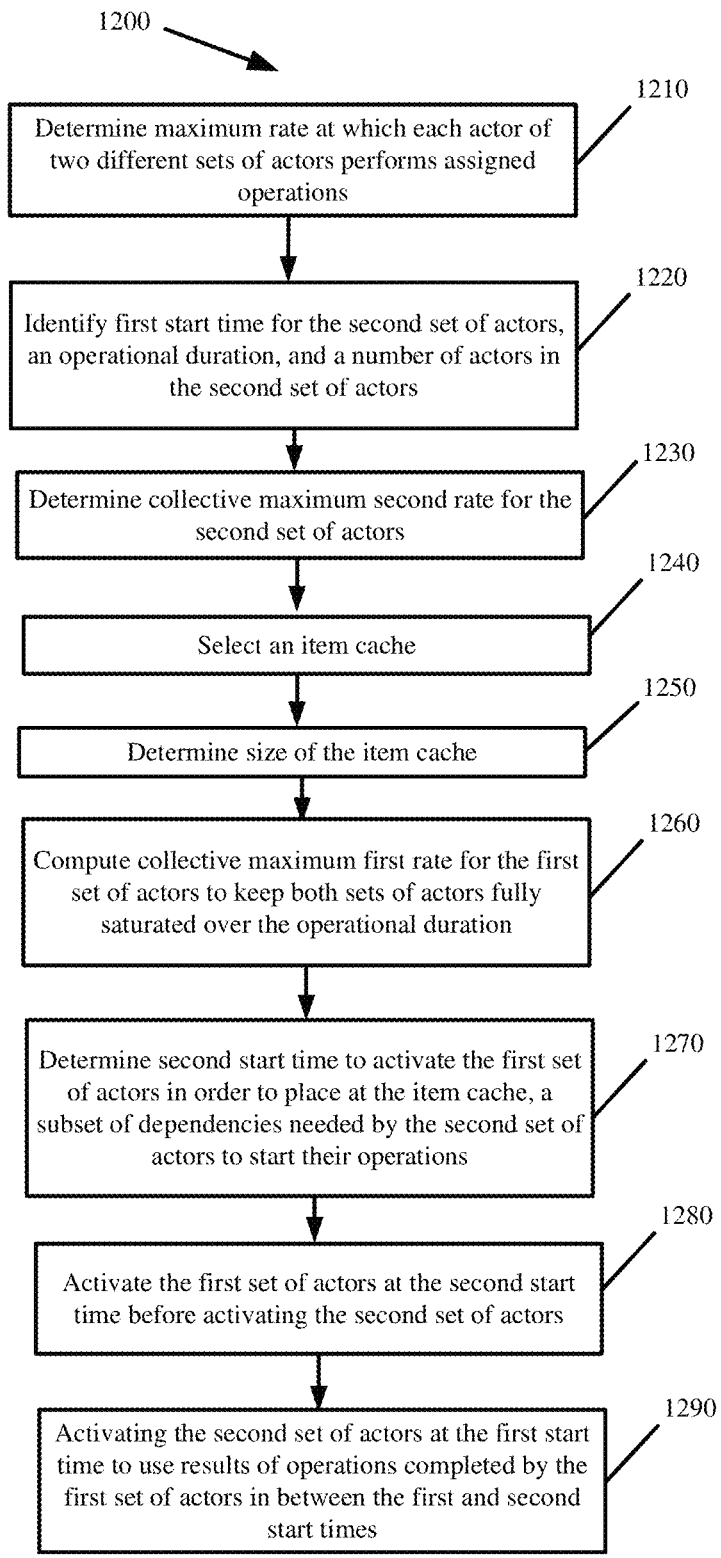
FIG. 12 presents a process for saturating different sets of actors, that may operate at different rates and times, with at least two sets of operations, with the execution of at least one set of operations being dependent on successful or completed execution of another set of operations, in accordance with some embodiments presented herein.

FIG. 12 presents a process 1200 for saturating different sets of actors, that may operate at different rates and times, with at least two sets of operations and with the execution of at least one set of operations being dependent on successful or completed execution of another set of operations, in accordance with some embodiments presented herein. Process 1200 may be implemented by coordinator 110. Process 1200 may be adapted for two or more different sets of actors, and a variety of tasks that involve two or more decoupled sets of operations for completion. Process 1200 may be performed when one or more sets of actors are inactive during off-business hours.

Process 1200 may include determining (at 1210) a maximum rate or different rates at which each actor of two different sets of actors performs assigned operations (when there is no resource conflict and the actor is not delayed, interfered with, or otherwise impacted when executing its respective set of operations). For instance, coordinator 110 may monitor past performance of set of retrievers 130 and set of packers 140 to determine a maximum first rate at which each retriever 130 performs item retrieval operations and a maximum second rate at which each packer 140 performs item picking, aggregating, and/or packing operations. In some embodiments, coordinator 110 may determine the maximum rate for a retriever 130 based on a first input from the retriever 130 providing an identifier of an item that is being retrieved from item storage 150 at a first time, and a second input from the same retriever 130 providing an identifier that identifies the item has placed to item cache 160. Coordinator 110 may similarly monitor or track the rate of a packer 140 based on inputs that identify when the packer picks an item from item cache 160 and when the packer 150 places the item in a package. Coordinator 110 may adjust the maximum rate of each actor to account for the specific operations that are to be performed by that actor. For instance, some retrieval operations may take longer to complete than other retrieval operations (e.g., retrieval of more distant item relative to retrieval of closer items) despite the same retriever 130 performing those retrieval operations. Similarly, some packing operations may take longer to complete than other packing operations (e.g., packing of large or heavy items relative to packing of small or light items) despite the same packer 140 performing those packing operations.

Process 1200 may include identifying (at 1220) a first start time at which a second set of actors commences operation, a period of time or duration during which the second set of actors is active, and a number of actors in the second set of actors that will be active during the duration. For instance, the second set of actors may operate at different shifts, and each shift may have a different number of actors active.

Process 1200 may include determining (at 1230) the collective maximum second rate for the second set of actors based on the identified (at 1220) number of actors in the second set of actors, and based on the determined (at 1210) maximum rate of each actor in the second set of actors.

Process 1200 may include selecting (at 1240) an item cache to queue items or other resources for operations performed by the second set of actors, and determining (at 1250) a size of the item cache. The size of the item cache may be derived from the number of slots or locations where items or other resources for operations performed by the second set of actors can be queued until they are accessed by the second set of actors.

Process 1200 may include computing (at 1260), based on the size of the item cache, a collective maximum first rate for the first set of actors that will be needed to replace items or other resources at the item cache to keep the second set of actors fully saturated and operating at the collective maximum second rate over the duration, and to also keep the first set of actors fully saturated before and during the duration. In particular, the first set of actors should produce a collective maximum first rate, that may be less than the collective maximum second rate of the second set of actors, but that is sufficient to replace items or resources at the item cache in a manner that still allows the second set of actors to access items and resources from the item cache at the collective maximum second rate without delay, interference, or other impact. More generally, coordinator 110 may compute (at 1260) a collective maximum first rate that ensures that the first set of actors completes different subsets of a first set of operations before the results of those subsets of operations are used by the second set of actors to perform a different second set operations. Accordingly, computing (at 1260) the collective maximum first rate for the first set of actors may include determining a number of actors to activate and operate as part of the first set of actors.

For example, the second set of actors may include 2 actors that access 5 items per interval for a collective maximum second rate of accessing 10 items per interval. The item cache may store 20 items, and the duration is 4 intervals. In this example, the second set of actors would be unable to perform operations after 2 intervals if the items or resources at the item cache are not replaced by the first set of actors. Each actor of the first set of actors may be able replace 1 item at the item cache per interval. Accordingly, based on the computation (at 1260), coordinator 110 may determine that 7 actors are needed for the first set of actors to perform at a collective maximum first rate of 7 replacements per interval. At this collective maximum first rate, the first set of actors can keep the second set of actors fully saturated over the duration, and allow the second set of actors to access 40 total items over the 4 interval duration. In particular, at the start of the duration (e.g., the first interval), the item cache may store 20 items that can be accessed by the second set of actors. Over the first interval, the second set of actors will have accessed 10 of the 20 items, and the first set of actors will have replaced 7 of the 10 accessed items, leaving 17 items at the item cache that have yet to be accessed by the second set of actors. Over the second interval, the second set of actors will have accessed another 10 of the 17 items, and the first set of actors will have replaced 7 of the 10 accessed items, leaving 14 items at the item cache that have yet to be accessed by the second set of actors. Over the third interval, the second set of actors will have accessed another 10 of the 14 items, and the first set of actors will have replaced at least 6 of the 10 accessed items, leaving at least the final 10 items at the item cache for the second set of actors to access over the fourth and final interval. Over the fourth and final interval, the first set of actors may clear the item cache, and ready the item cache for the next shift. In this example, both the first and second sets of actors are fully saturated over the duration despite the different sets of actors operating at different rates.

Process 1200 may include determining (at 1270) a second start time to activate the first set of actors before the identified (1220) first start time of the second set of actors. The difference between the second start time and the first start time provides a buffer during which the first set of actors, operating at the collective maximum first rate, populate the item cache with items or resources that will be accessed by the second set of actors over the duration. In other words, coordinator 110 may determine (at 1270) a start time that provides the slower operating first set of actors with a sufficient buffer to complete a subset of the first set of operations and to provide dependencies at the item cache for an initial subset of the second set of operations that will be performed by the second set of actors. Continuing with the example above, coordinator 110 may set the start time to be 3 intervals before the start time of the second set of actors. During each of these 3 intervals, the first set of actors can place 7 new items on the item cache so that the item cache holds 20 items when the second set of actors begin operation.

Process 1200 may include activating (at 1280) the first set of actors at the second start time. Activating (at 1280) the first set of actors may include continually providing operations to each actor of the first set of actors so that the first set of actors operates at the collective maximum first rate, and so that the first set of actors complete dependencies for a subset of the second set of operations that will be performed by the second set of actors.

Process 1200 may then include activating (at 1290) the second set of actors at the identified (at 1220) first time, and continually providing operations to each actor of the second set of actors so that the first and second sets of actors perform different dependent sets of operations in parallel over the duration at their different collective maximum rates without delaying, interfering, or impacting each other. More specifically, the second set of actors use the results of already completed operations of the first set of actors to complete a first set of tasks at the collective maximum second rate while the first set of actors complete additional operations, that provide the dependencies needed by the second set of actors to complete a second set of tasks, at the slower collective maximum first rate.

Figure 13:
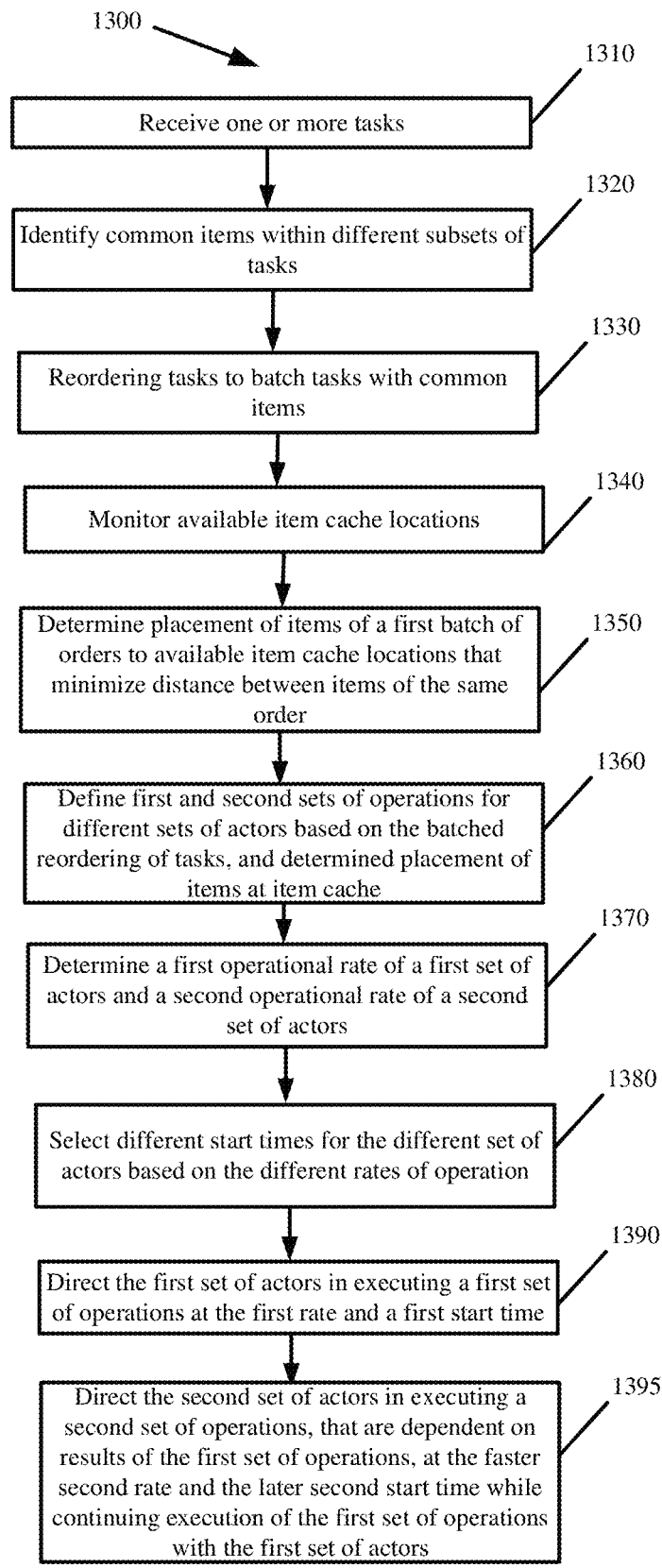
FIG. 13 presents a process for optimizing the dependent and decoupled sets of operations performed by the different sets of actors at different times and rates in accordance with some embodiments presented herein.

FIG. 13 presents a process 1300 for optimizing the dependent and decoupled sets of operations performed by the different sets of actors at different times and rates to maximize throughput or task execution in accordance with some embodiments presented herein. Process 1300 may be implemented by coordinator 110. Process 1300 may be adapted for two or more different sets of actors, and a variety of tasks that involve two or more decoupled sets of operations for completion.

Process 1300 may include receiving (at 1310) one or more tasks for the different sets of actors to complete. The tasks may include order fulfillment tasks. For instance, coordinator 110 may receive (at 1310) one or more orders from customers requesting different items in item storage 150. In some embodiments, coordinator 110 may receive (at 1310) the tasks as a result of queries to a purchase order system, order management system, order fulfillment system, and/or other system or database. In some embodiments, coordinator 110 may directly receive (at 1310) the two or more tasks from different servers, computer systems, databases, or devices. Coordinator 110 may receive (at 1310) the tasks at one time if the tasks are placed in a queue until being processed by coordinator 110. For instance, orders received after a particular time of day may be queued for fulfillment at the start of the next business day. Additionally, or alternatively, coordinator 110 may receive (at 1310) some tasks as those tasks are generated.

Process 1300 may include inspecting the received tasks to identify (at 1320) common operations within different subsets of the tasks. With respect to order fulfillment tasks, coordinator 110 may identify (at 1320) orders that include one or more of the same items.

Process 1300 may include batching (at 1330) tasks with common operations for a first optimization of the tasks. Batching (at 1330) may include reordering the task execution so that tasks with common operations are executed contemporaneously, sequentially, or together. In particular, coordinator 110 may batch (at 1330) tasks involving orders with common items to minimize the number of times those items are transferred from item storage 150 to item cache 160. Process 1300 may perform a second optimization of the tasks by monitoring (at 1340) available slots or locations of item cache 160, and by determining (at 1350) an optimal placement of the task items to the available locations of item cache 160 that minimizes movement of packers 140 or other actors of a second set of actors that access the items from item cache 160. Determining (at 1350) an optimal placement may involve a series of placements and replacements. For instance, coordinator 110 may determine (at 1350) a first optimal placement for an initial set of items that can be used to complete a first subset of the batched tasks with minimal movement of packers 140 about item cache 160, and may determine (at 1350) an optimal placement of a next item to replace an item from the initial set of items that is no longer needed. In other words, rather than replace an arbitrary item from the initial set of items with the next item, coordinator 110 detects which of the initial set of items can be replaced, and determines (at 1350) a location for the next item that minimizes movement of a packer 140 or other actor in completing a next task or second subset of the batched tasks.

Process 1300 may include defining (at 1360) at least a first set of operations for transferring items from item storage 150 according to the batched (at 1330) reordering of the tasks, and for placing the transferred items to the determined (at 1350) optimal locations about item cache 160, and a second set of operations for picking and grouping items to complete the order fulfillment tasks according to the batched (at 1330) ordering of the tasks.

Process 1300 may include determining (at 1370) a maximum first rate at which each actor from a first set of actors performs an operation from the first set of operations (e.g., transferring items from item storage 150 according to the batch reordering of tasks, and placing the items to specific location about item cache 160 according to the determined optimal placement), and a maximum second rate at which a second set of actors can perform the second set of operations (e.g., for picking and grouping items for different order fulfillment tasks). Based on the maximum first rate and the maximum second rate, process 1300 may include selecting (at 1380) a start time and/or number of actors for the first set of actors that is sufficient to saturate the first set of actors with continuous execution of the first set of operations over a desired amount of time while also saturating the second set of actors with continuous execution of the second set of operations without the first rate at which the first set of actors perform the first set of operations delaying, interfering, or otherwise impacting the second set of actors beginning or completing the second set of operations at the second rate.

Process 1300 may include directing (at 1390) the first set of actors at the selected start time and with the selected number of actors to continuously perform the first set of operations at the maximum first rate, and further directing (at 1395) the second set of actors to continuously perform the second set of operations, that are dependent on results of the first set of operations, at a later second time and at the faster maximum second rate while continuing execution of the first set of operations with the first set of actors.

In some embodiments, coordinator 110 may reverse the operational flow of the sets of operations performed by the different sets of actors. Coordinator 110 may reverse the operational flow to complete other tasks such as inventory replenishment and/or order returns.

For instance, coordinator 110 may direct the second set of actors in placing newly received inventory items or objects to item cache 160 at a first rate, and may coordinate or control the first set of actors in transferring the inventory items or objects into item storage 150. To maintain full saturation of both sets of actors in this scenario, coordinator 110 may monitor a first rate at which the second set of actors place replenished items or objects to item cache 160, may monitor a second rate at which the first set of actors transfer the items or object to item storage 150, and may adjust the number of the first set of actors or the second set of actors to ensure both sets of actors are saturated without delaying, interfering, or otherwise impacting the operations performed by the other set of actors. For instance, if the second set of actors included two actors placing replenished items or objects on item cache 160 at a rate of five items per time interval, and each actor of the first set of actors average one item transfer per time interval, coordinator 110 may increases the size of the first set of actors to first actors so that the first set of actors can keep pace with the second set of actors.

For order returns, coordinator 110 may detect the items that have been returned, may detect commonality in the returned items, and may reorder the returns according to the detected commonality. Coordinator 110 may then direct the first set of actors in transferring objects or containers that contain a first set of returned items from item storage 150 to item cache 160, and may direct the second set of actors in placing the returned items to the correct objects or containers.

Figure 14:
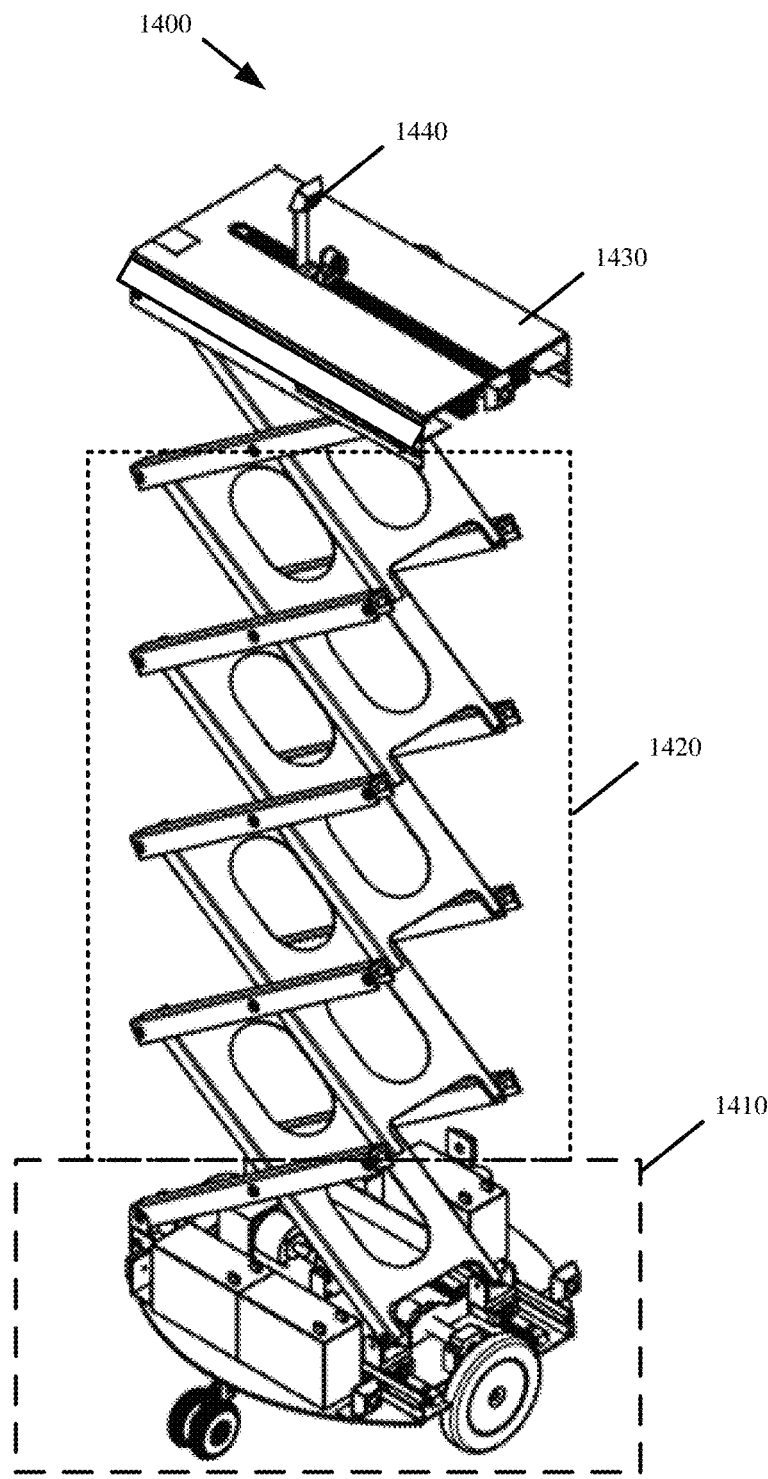
FIG. 14 illustrates some of the sensors and actuators of an example robot in accordance with some embodiments presented herein.

As noted above, the first and second sets of actors may include autonomous robots. FIG. 14 illustrates some of the sensors and actuators of example robot 1400 in accordance with some embodiments presented herein. Robot 1400 may include motorized base 1410 that powers locomotion or movement of robot 1400 in three-dimensional space. Motorized base 1410 may have one or more sensors and actuators including, for example, one or more drive motors, wheel encoders, gyroscopes, accelerometers, inertial sensors, scanners, LIDAR, wireless radios, and cameras. Motorized base 1410 may further include batteries, processors, wheels, and/or other components used to operate robot 1400. In some embodiments, motorized base 1410 may include other actuators including articulating legs, propellers, tracks, or other means of locomotion besides the illustrated wheels.

Atop and/or attached to motorized base 1410 may be additional actuators such as lift 1420. Lift 1420 may raise and lower platform 1430. As shown, lift 1420 may include a collapsing and expanding structure. In some embodiments, lift 1420 may include a pneumatic piston or other means for raising and lowering platform 1430.

Platform 1430 may include an elongated surface onto which objects retrieved by robot 1400 may be retained during transport. Platform 1430 may also include mechanical retriever 1440 with one or more actuators and/or sensors for retrieving objects onto platform 1430.

Mechanical retriever 1440 may include at least one motor or actuator for moving mechanical retriever 1440 across the surface of platform 1430 in order to engage an object and then pull the object onto platform 1430. Mechanical retriever 1440 may include one or more retrieval elements. The retrieval element may include a vacuum that uses suction to engage containers and/or other objects. The retrieval element may alternatively include a gripper, articulating mechanical arm, or other actuators to grab or otherwise engage containers and/or objects.

One or more sensors about platform 1430 or mechanical retriever 1440 may be used to determine a height of platform 1430, alignment and/or other positioning of mechanical retriever 1440 relative to an object. The one or more sensors about platform 1430 or mechanical retriever 1440 may include cameras, patterned light emitters and detectors, scanners, readers, depth sensors (to detect distance between mechanical retriever 1450 and an object), load sensors (or weight sensors to determine force for moving an object), and/or force sensors (to detect contact with an object).

Figure 15:
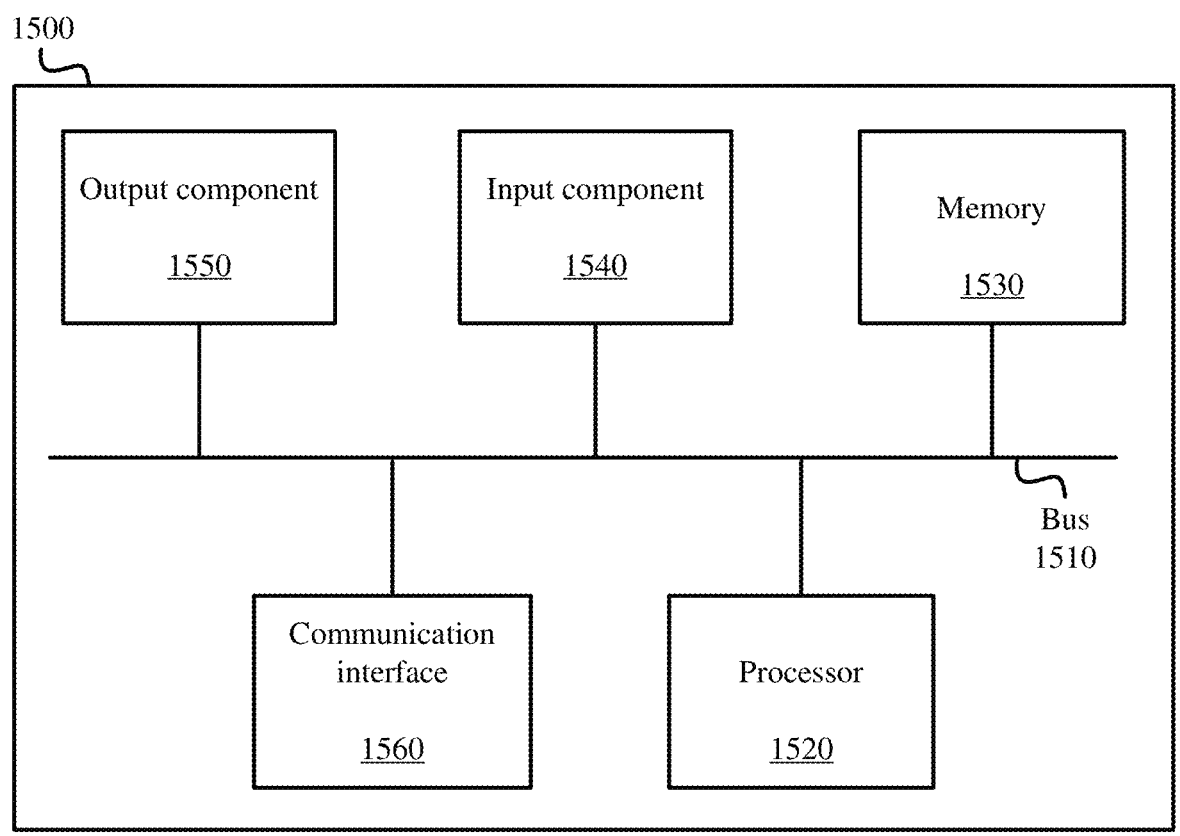
FIG. 15 illustrates example components of one or more devices, according to one or more embodiments described herein.

FIG. 15 is a diagram of example components of device 1500. Device 1500 may be used to implement one or more of the devices or systems described above (e.g., coordinator 110, purchase order system, order management system, order fulfillment system, inventory management system, robot control system, etc.). Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
tracking, at an order fulfillment system, a first rate at which a first set of actors comprising a set of robots transfer ordered items from different locations in a storage to an item cache, and a second rate at which a second set of actors remove ordered items from the item cache as part of order fulfillment operations, wherein the second rate is faster than the first rate;
receiving, at the order fulfillment system, a plurality of orders for a plurality of items that are located in the storage;
determining, by the order fulfillment system, a first start time and an end time for a particular time during which the second set of actors are active;
computing, by the order fulfillment system, a second start time for the first set of actors, that commences before the first start time, based on a difference between the second rate and the first rate, wherein a difference between the second start time and the first start time ensures that the item cache is not depleted before the end time of the particular time despite the first set of actors transferring the ordered items to the item cache at the first rate that is slower than the second rate at which the second set of actors remove the ordered items from the item cache;
prioritizing fulfillment of a first set of the plurality of orders over a second set of the plurality of orders based on different priorities associated with the plurality of orders, wherein one or more of the first set of orders are received after one or more of the second set of orders;

transferring, with the set of robots, a set of items belonging to the first set of orders from the storage to the item cache at the first rate during a period of time between the second start time and the first start time based on the prioritizing fulfillment of the first set of orders over the second set of orders;

determining a probability that each item of the plurality of items placed in the item cache is specified as part of a future order that is not within the received plurality of orders;

controlling, during the particular time, the second set of actors in removing, at the second rate, one or more units of items at a first set of positions about the item cache for different orders of the plurality of orders;

simultaneously controlling, during the particular time, the first set of actors in replacing, at the first rate, items at a second set of positions about the item cache that are associated with a lower probability than items at a third set of positions about the item cache that are associated with a higher probability, wherein the set of items entered in the item cache before the first start time and a number of items added to the item cache at the first rate during the particular time by the first set of actors enables the first set of actors to operate at the first rate and the second set of actors to operate at the second rate during the particular time without interruption and without a reduction in the first rate or the second rate.

2. The method of claim 1,
wherein the first rate equals a maximum rate by which the first set of actors perform said transferring and replacing; and
wherein the second rate equals a maximum rate by which the second set of actors perform said removing.

3. The method of claim 1 further comprising:
identifying common items requested as part of different subsets of the first set of orders; and
changing fulfillment of the first set of orders from a first ordering to a different second ordering, wherein the second ordering comprises the first set of orders with the common items in sequence.

4. The method of claim 3, wherein said transferring of the first set of items comprises:
retrieving, at one time, multiple units of a particular item for a particular subset of orders that request the particular item.

5. The method of claim 1 further comprising:
identifying at least first and second items of a first order from the plurality of orders;
determining a set of available slots from a plurality of slots at the item cache; and
wherein said transferring comprises placing the first and second items to first and second slots from the set of available slots of the item cache that neighbor one another.

6. The method of claim 1,
wherein computing the second start time comprises setting the difference between the second start time and the first start time based on a size of the item cache, the first rate, and the second rate.

7. The method of claim 1,
wherein said transferring comprises placing a first set of dependencies on the item cache during the period of time;
wherein said removing comprises using the first set of dependencies to fulfill the first set of orders at the second rate during a first half of the particular time;

wherein said replacing comprises establishing a second set of dependencies on the item cache; and
wherein said removing further comprises using the second set of dependencies to fulfill the second set of the plurality of orders at the second rate during a later second half of the particular time.

8. The method of claim 1, wherein said tracking comprises:
monitoring the first rate based on a difference in time between receiving a first identifier identifying an item being retrieved from the storage, and a second identifier identifying the item being placed to the item cache;
monitoring the second rate based on a difference in time between receiving a third identifier identifying the item being picked from the item cache, and a fourth identifier identifying the item being placed as part of a customer order.

9. The method of claim 1,
wherein transferring the first set of items comprises activating one or more actuators and sensors of the set of robots to retrieve and move the first set of items to the item cache based on control exerted by the order fulfillment system over the set of robots.

10. The method of claim 1, wherein said tracking comprises:
receiving, at the order fulfillment system, wireless messages when a first actor of the first set of actors commences and completes a transfer operation and when a second actor of the second set of actors commences and completes a removal operation;
determining the first rate based on a difference in time between receiving a first message indicating commencement of the transfer operation and a second message indicating completion of the transfer operation; and
determining the second rate based on a difference in time between receiving a third message indicating commencement of the removal operation and a second message indicating completion of the removal operation.

11. A device comprising:
one or more processors configured to:
track a first rate at which a first set of actors comprising a set of robots transfer ordered items from different locations in storage to an item cache, and a second rate at which a second set of actors remove ordered items from the item cache as part of order fulfillment operations, wherein the second rate is faster than the first rate;
receive a plurality of orders for a plurality of items that are located in the storage;
determine a first start time and an end time for a particular time during which the second set of actors are active;
compute an earlier second start time for the first set of actors that commences before the first start time, based on a difference between the second rate and the first rate, wherein a difference between the second start time and the first start time ensures that the item cache is not depleted before the end time of the particular time despite the first set of actors transferring the ordered items to the item cache at the first rate that is slower than the second rate at which the second set of actors remove the ordered items from the item cache;
prioritize fulfillment of a first set of the plurality of orders over a second set of the plurality of orders based on different priorities associated with the plurality of orders, wherein one or more of the first set of orders are received after one or more of the second set of orders;

transfer, with the set of robots, a set of items belonging to the first set of orders from the storage to the item cache at the first rate during a period of time between the second start time and the first start time based on the prioritizing fulfillment of the first set of orders over the second set of orders;

determine a probability that each item of the plurality of items placed in the item cache is specified as part of a future order that is not within the received plurality of orders;

direct, during the particular time, the second set of actors in removing, at the second rate, one or more units of items at a first set of positions about the item cache for different orders of the plurality of orders;

simultaneously direct, during the particular time, the first set of actors in replacing, at the first rate, items at a second set of positions about the item cache that are associated with a lower probability than items at a third set of positions about the item cache that are associated with a higher probability, wherein the set of items entered in the item cache before the first start time and a number of items added to the item cache at the first rate during the particular time by the first set of actors enables the first set of actors to operate at the first rate and the second set of actors to operate at the second rate during the particular time without interruption and without a reduction in the first rate or the second rate.

12. The device of claim 11, wherein the one or more processors are further configured to:

identify common items requested as part of the first set of orders; and change fulfillment of the first set of orders from a first ordering to a different second ordering, wherein the second ordering comprises the first set of orders with the common items in sequence.

13. The device of claim 11, wherein one or more processors are further configured to:

identify at least first and second items of a first order from the plurality of orders;

determine a set of available slots from a plurality of slots at the item cache; and wherein said transferring comprises placing the first and second items to first and second slots from the set of available slots of the item cache that neighbor one another.

14. The device of claim 11, wherein computing the second start time comprises setting the difference between the second start time and the first start time based on a size of the item cache, the first rate, and the second rate.

15. The device of claim 11, wherein said tracking comprises:

monitoring the first rate based on a difference in time between receiving a first identifier identifying an item being retrieved from the storage, and a second identifier identifying the item being placed to the item cache; and monitoring the second rate based on a difference in time between receiving a third identifier identifying the item being picked from the item cache, and a fourth identifier identifying the item being placed as part of a customer order.

16. A non-transitory computer-readable medium, storing a set of processor-executable instructions, which, when executed by one or more processors of an order fulfillment system, cause the one or more processors to:

track, at the order fulfillment system, a first rate at which a first set of actors comprising a set of robots transfer ordered items from different locations in storage to an item cache, and a second rate at which a second set of actors remove ordered items from the item cache as part of order fulfillment operations, wherein the second rate is faster than the first rate;

receive, at the order fulfillment system, a plurality of orders for a plurality of items that are located in the storage;

determine, by the order fulfillment system, a first start time and an end time for a particular time during which the second set of actors are active;

compute, at the order fulfillment system, a second start time for the first set of actors, that commences before the first start time, based on a difference between the second rate and the first rate, wherein a difference between the second start time and the first start time ensures that the item cache is not depleted before the end time of the particular time despite the first set of actors transferring the ordered items to the item cache at the first rate that is slower than the second rate at which the second set of actors remove the ordered items from the item cache;

prioritize fulfillment of a first set of the plurality of orders over a second set of the plurality of orders based on different priorities associated with the plurality of orders, wherein one or more of the first set of orders are received after one or more of the second set of orders;

transfer, with the set of robots, a set of items belonging to the first set of orders from the storage to the item cache at the first rate during a period of time between the second start time and the first start time based on the prioritizing fulfillment of the first set of orders over the second set of orders;

determine a probability that each item of the plurality of items placed in the item cache is specified as part of a future order that is not within the received plurality of orders;

control, during the particular time, the second set of actors in removing, at the second rate, one or more units of items at a first set of positions about the item cache for different orders of the plurality of orders;

simultaneously control, during the particular time, the first set of actors in replacing, at the first rate, items at a second set of positions about the item cache that are associated with a lower probability than items at a third set of positions about the item cache that are associated with a higher probability, wherein the set of items entered in the item cache before the first start time and a number of items added to the item cache at the first rate during the particular time by the first set of actors enables the first set of actors to operate at the first rate and the second set of actors to operate at the second rate during the particular time without interruption and without a reduction in the first rate or the second rate.

* * * * *